(12) United States Patent
Reu

(10) Patent No.: US 10,971,963 B2
(45) Date of Patent: Apr. 6, 2021

(54) INSULATOR OF STATOR AND STATOR

(71) Applicant: LG ELECTRONICS INC., Seoul (KR)

(72) Inventor: Jinwook Reu, Seoul (KR)

(73) Assignee: LG Electronics Inc., Seoul (KR)

(*) Notice: Subject to any disclaimer, the term of this patent is extended or adjusted under 35 U.S.C. 154(b) by 37 days.

(21) Appl. No.: 16/383,125

(22) Filed: Apr. 12, 2019

(65) Prior Publication Data

US 2019/0319506 A1    Oct. 17, 2019

(30) Foreign Application Priority Data

Apr. 17, 2018 (KR) .................. 10-2018-0044616

(51) Int. Cl.
  *H02K 3/52* (2006.01)
  *H02K 3/38* (2006.01)
  *H02K 3/18* (2006.01)
  *H02K 1/14* (2006.01)

(52) U.S. Cl.
  CPC ............ *H02K 3/38* (2013.01); *H02K 1/146* (2013.01); *H02K 3/18* (2013.01); *H02K 3/522* (2013.01)

(58) Field of Classification Search
  CPC .... H02K 3/522; H02K 1/146; H02K 2203/06; H02K 2203/09
  See application file for complete search history.

(56) References Cited

U.S. PATENT DOCUMENTS

| 7,626,303 B2 * | 12/2009 | Watanabe | H02K 3/522 310/194 |
| 8,288,903 B2 * | 10/2012 | Matsuda | H02K 3/38 310/71 |
| 8,847,457 B2 * | 9/2014 | Yoshida | H02K 15/095 310/194 |

(Continued)

FOREIGN PATENT DOCUMENTS

| CN | 1860661 | 12/2006 |
| CN | 101694954 | 4/2010 |

(Continued)

OTHER PUBLICATIONS

Aiken, Le, "Motor Coil for Powering Auxiliary Devices," IBM TDB Archive, dated Jan. 1, 1980, 2 pages.

(Continued)

*Primary Examiner* — Dang D Le
(74) *Attorney, Agent, or Firm* — Fish & Richardson P.C.

(57) ABSTRACT

An insulator is configured to couple to a top portion of a stator core and includes: a main body that has a ring shape; a plurality of insulating teeth that protrude toward a center portion of the main body and that are configured to couple to a plurality of teeth of the stator core, respectively; and a plurality of guide tabs that protrude from an outer circumferential surface of the main body at positions corresponding to the plurality of insulating teeth. The plurality of guide tabs are configured to guide (i) phase coils that are wound around the plurality of insulating teeth and (ii) neutral coils along the outer circumferential surface in a circumferential direction. Each of the plurality of guide tabs defines a plurality of guide grooves, each of the plurality of guide grooves being configured to seat at least one of the phase coils or the neutral coils.

19 Claims, 25 Drawing Sheets

(56) References Cited

U.S. PATENT DOCUMENTS

| | | | | |
|---|---|---|---|---|
| 8,941,275 | B2* | 1/2015 | Genda | H02K 5/225 |
| | | | | 310/71 |
| 9,024,500 | B2* | 5/2015 | Kimura | F01D 25/08 |
| | | | | 310/194 |
| 10,700,565 | B2* | 6/2020 | Wust | H02K 15/085 |

FOREIGN PATENT DOCUMENTS

| | | |
|---|---|---|
| CN | 101730969 | 6/2010 |
| CN | 102201708 | 9/2011 |
| CN | 102751797 | 10/2012 |
| CN | 102986120 | 3/2013 |
| CN | 205017124 | 2/2016 |
| EP | 1526628 | 3/2011 |
| KR | 1020130133379 | 12/2013 |
| KR | 1020100116161 | 5/2015 |
| KR | 1020130141079 | 10/2015 |

OTHER PUBLICATIONS

Chinese Office Action in Chinese Application No. 201810909456.8, dated Sep. 29, 2020, 12 pages (with English translation).
Ruijun et al., "Study on improving insulation structure of the stator coil for large turbogenerator," China Sciencepaper, dated Jul. 2016, 3 pages (with English abstract).
Chinese Notice of Allowance in Chinese Appln. No. 2018109094568, dated Feb. 1, 2021, 14 pages (with English translation).

* cited by examiner

INSULATOR OF STATOR AND STATOR

CROSS-REFERENCE TO RELATED APPLICATIONS

Pursuant to 35 U.S.C. § 119(a), this application claims the benefit of an earlier filing date of and the right of priority to Korean Application No. 10-2018-0044616, filed on Apr. 17, 2018, the contents of which are incorporated by reference herein in their entirety.

FIELD

The present disclosure relates to a stator insulator coupled to a stator of a motor and a stator, and more particularly to a stator insulator for parallel connection of concentrated winding and a stator having the same.

BACKGROUND

A motor may include a stator insulator coupled to a stator core of the motor to connect a coil wound around the stator core.

In some cases, a direct crimping type process, one of parallel connection processes, may be performed by a large number of people with a long manufacturing time through a plurality of manual processes to arrange a lead wire and a neutral wire. In some cases, the direct crimping type process may increase a motor manufacturing cost compared to a serial connection process. In some cases, a parallel connection process of a busbar type may simplify the connection process, but may involve an additional work in winding arrangement and an increase in a motor material cost, which may limit reduction of the motor manufacturing cost.

In some examples, in a motor connecting method, a busbar assembly may be made after primary winding arrangement by bending a coil wound on the motor using a coil guide groove formed on a mold object so as to be bent toward the mold object, and arranging the coil after a coil cutting task by bending the primarily-arranged coil again to be connected to a busbar connection tab.

In some examples, a large number of busbar housings and connection tabs may be required, which may increase the motor material cost. In some cases, a working speed, due to addition of the coil bending operation and the coil cutting operation, may be decreased. In some cases, an additional busbar connection tab may be required due to a coil diameter, which may limit a range of a diameter of the coil to be applicable to the busbar connection tab.

In some examples, a motor connecting method may use a busbar assembly connecting structure, in which one coil is sequentially wound around all teeth so as to be connected in parallel.

In some cases, the motor connecting method may require a large number of busbars and structures for motor parallel connection, which may increase a motor manufacturing cost. In some cases, a plurality of winding coil contact portions may be generated, which may result in lowering connection reliability of the contact portions. In some cases, it may take much time to perform a contact task between the coil and the busbar.

In some cases, a parallel winding connection may have difficulty in connecting the parallel winding structure and cause an increase in a manufacturing cost due to a large number of components. In some cases, a process time may increase to manufacture and connect the motor, and a reliability of the motor may be lowered due to an unstable connection.

SUMMARY

One aspect of the present disclosure is to provide a stator insulator for parallel connection of concentrated winding without use of a separate busbar assembly, and a stator having the same.

Another aspect of the present disclosure is to provide a stator insulator capable of facilitating parallel connection of a coil without a complicated connection process and an identification of the parallel connection, and a stator having the same.

Another aspect of the present disclosure is to provide a stator insulator capable of allowing parallel connection by reducing a number of contact portions of coils which are generated during a concentrated winding parallel connection process, and a stator having the same.

In order to achieve those aspects and other advantages, a stator insulator disclosed in this specification may be configured to employ a structure of mounting and connecting coils wound on a stator core to an insulator coupled to a top of the stator core, so that the coils drawn out to the top of the stator core can be mounted and connected to the insulator.

To achieve this, a stator insulator disclosed in the present specification may include a plurality of guide tabs for allowing three-phase coils and neutral coils of the respective three-phase coils to be mounted along an outer circumferential surface of the insulator in a circumferential direction, so as to connect the three-phase coils and the neutral coils through the plurality of guide tabs.

Here, each of the plurality of guide tabs may be provided with a plurality of guide grooves on which the three-phase coils and the neutral coils are mounted, respectively.

Accordingly, the three-phase coils and the neutral coils are placed on the insulator through the plurality of guide grooves, respectively, and connected.

According to the stator insulator disclosed herein having such technical features, parallel connection of coils and organization of lead wires on the insulator coupled to the stator core can be performed without a separate assembly for the parallel connection, so as to achieve the aforementioned advantages.

According to one aspect of the subject matter described in this application, an insulator of a stator that includes a stator core is configured to couple to a top portion of the stator core. The insulator includes: a main body that has a ring shape; a plurality of insulating teeth that protrude toward a center portion of the main body and that are configured to couple to a plurality of teeth of the stator core, respectively; and a plurality of guide tabs that protrude from an outer circumferential surface of the main body at positions corresponding to the plurality of insulating teeth. The plurality of guide tabs are configured to guide (i) phase coils that are wound around the plurality of insulating teeth and (ii) neutral coils along the outer circumferential surface in a circumferential direction. Each of the plurality of guide tabs defines a plurality of guide grooves, each of the plurality of guide grooves being configured to seat at least one of the phase coils or the neutral coils.

Implementations according to this aspect may include one or more of the following features. For example, the plurality of guide grooves are arranged along a height direction of each of the plurality of guide tabs and extend in a radial direction of the main body. Each of the plurality of guide tabs may include a plurality of insulating layers that define the plurality of guide grooves and that are arranged along the height direction to seat the phase coils and the neutral coils at different heights from one another. In some case, a lowermost groove among the plurality of guide grooves may be configured to seat the neutral coils.

In some examples, the phase coils comprise a U-phase coil, a V-phase coil, and a W-phase coil. The plurality of guide grooves include a U-phase guide groove configured to seat the U-phase coil, a V-phase guide groove configured to seat the V-phase coil, a W-phase guide groove configured to seat the W-phase coil, and a neutral guide groove configured to seat the neutral coils. The U-phase guide groove, the V-phase guide groove, the W-phase guide groove, and the neutral guide groove may be arranged along the height direction. In some examples, each of the U-phase guide groove, the V-phase guide groove, and the W-phase guide groove is configured to seat at least two coils and has a first height that is greater than or equal to a thickness of the two coils, where the neutral guide groove is configured to seat at least three coils and has a second height that is greater than or equal to a thickness of the three coils.

In some implementations, the plurality of guide grooves are spaced apart from one another by a distance that is greater than or equal to a predetermined interval. In some examples, each of the plurality of insulating layers has a predetermined height between adjacent guide grooves among the plurality of guide grooves.

In some implementations, the plurality of guide tabs may include: a plurality of terminal tabs configured to connect to a three-phase power source and to the phase coils that extend from the three-phase power source; a plurality of middle tabs through which the phase coils and the neutral coils pass; and a plurality of neutral tabs configured to connect to the neutral coils. In some examples, each of the plurality of guide tabs defines a phase coil groove that is disposed at a side of each of the plurality of guide tabs, that extends in a vertical direction, and that allows the phase coils to be drawn out in an outer diameter direction of the main body or to be inserted in an inner diameter direction of the main body therethrough.

In some examples, the plurality of guide grooves may be arranged at different heights, where each height corresponds to a phase of an insulating tooth among the plurality of insulating teeth. The phase coil groove may extend in the vertical direction to a guide groove among the plurality of guide grooves corresponding to the phase of the insulating tooth. In some cases, the phase coil groove is defined at a side of each of the plurality of terminal tabs, and allows the phase coils to extend to a neighboring guide tab among the plurality of terminal tabs and to be seated at the neighboring guide tab. The phase coil groove may be further defined at a side of each of the plurality of middle tabs and the plurality of neutral tabs, and is configured to receive the phase coils that extend from a neighboring guide tab among the plurality of middle tabs and the plurality of neutral tabs.

In some implementations, each of the plurality of terminal tabs may define a power terminal coupling groove that is disposed at an upper portion of each of the plurality of terminal tabs and that is configured to couple to a power terminal connected to the three-phase power source or at least one of the phase coils. Each of the plurality of neutral tabs may define a neutral terminal coupling groove that is disposed at an upper portion of each of the plurality of neutral tabs and that is configured to couple to a neutral terminal connected to the neutral coils.

In some examples, each of the power terminal and the neutral terminal may include a plurality of slots, where one of the plurality of slots is configured to connect to one coil, and another of the plurality of slots is configured to connect to two or more coils. In some examples, each of the plurality of neutral tabs may define a neutral coil groove that is disposed at a side of a lowermost guide groove among the plurality of guide grooves and that allows the neutral coils to be drawn out in an outer diameter direction of the main body or to be inserted in an inner diameter direction of the main body therethrough.

According to another aspect, a stator includes a stator core, and an insulator coupled to a top portion of the stator core. The insulator includes: a main body that has a ring shape; a plurality of insulating teeth that protrude toward a center portion of the main body and that are coupled to a plurality of teeth of the stator core, respectively; and a plurality of guide tabs that protrude from an outer circumferential surface of the main body at positions corresponding to the plurality of insulating teeth. The plurality of guide tabs are configured to guide (i) phase coils that are wound around the plurality of insulating teeth and (ii) neutral coils along the outer circumferential surface in a circumferential direction. The plurality of guide tabs include: a plurality of terminal tabs configured to connect to a three-phase power source and to the phase coils that extend from the three-phase power source; a plurality of middle tabs through which the phase coils and the neutral coils pass; and a plurality of neutral tabs configured to connect to the neutral coils. Each of the plurality of guide tabs defines a plurality of guide grooves that are separated from one another and that are configured to seat at least one of the phase coils or the neutral coils.

Implementations according to this aspect may include one or more of the following features or the features described above for the insulator. For example, each of the plurality of guide tabs may define a phase coil groove that is disposed at a side of each of the plurality of guide tabs and that allows the phase coils to be drawn out in an outer diameter direction of the main body or to be inserted in an inner diameter direction of the main body therethrough.

In some implementations, each of the plurality of terminal tabs may include a power terminal that is disposed at an upper portion of each of the plurality of terminal tabs and that is configured to connect to the three-phase power source or at least one of the phase coils. In some examples, each of the plurality of neutral tabs may include a neutral terminal that is disposed at an upper portion of each of the plurality of terminal tabs and that is configured to connect to the neutral coils.

In some examples, each of the plurality of neutral tabs may define a neutral coil groove that is disposed at a side of a lowermost guide groove among the plurality of guide grooves and that allows the neutral coils to be drawn out in an outer diameter direction of the main body or to be inserted in an inner diameter direction of the main body therethrough.

A stator insulator and a stator described in this specification are configured such that a plurality of guide tabs are provided to allow three-phase coils and neutral coils of the respective three-phase coils to be mounted to the insulator along an outer circumferential surface of the insulator in a circumferential direction, so that the three-phase coils and the neutral coils can be connected through the plurality of guide tabs, thereby enabling parallel connection of concentrated windings without use of a separate busbar assembly.

Accordingly, as the insulator is provided with the plurality of guide tabs for allowing the three-phase coils and the neutral coils of the respective three-phase coils to be mounted along the outer circumferential surface in the circumferential direction, the connection of the three-phase coils and the neutral coils can be made through the plurality of guide tabs, which may facilitate parallel connection of coils and identification of the parallel connection without a complicated connection process.

Further, by using three wiring terminals for nine three-phase coils (lead wires) and three wiring terminals for nine neutral coils which are generated in a nine-slot stator core, three coils can be connected per one terminal, which may result in reducing contact portions of coils which are generated during a concentrated wiring parallel connection.

Accordingly, reliability of connected portions and stabilization of process quality can be achieved, and time and cost required for processes of the stator during a three-phase parallel connection can be reduced.

As a result, the stator insulator and the stator disclosed in this specification can improve limitations in related art, and also enhance simplicity, efficiency, utility, ease, reliability, stability, and economical efficiency as compared with a three-phase parallel connection technology and a stator assembly in the related art.

DETAILED DESCRIPTION

Figure 1:
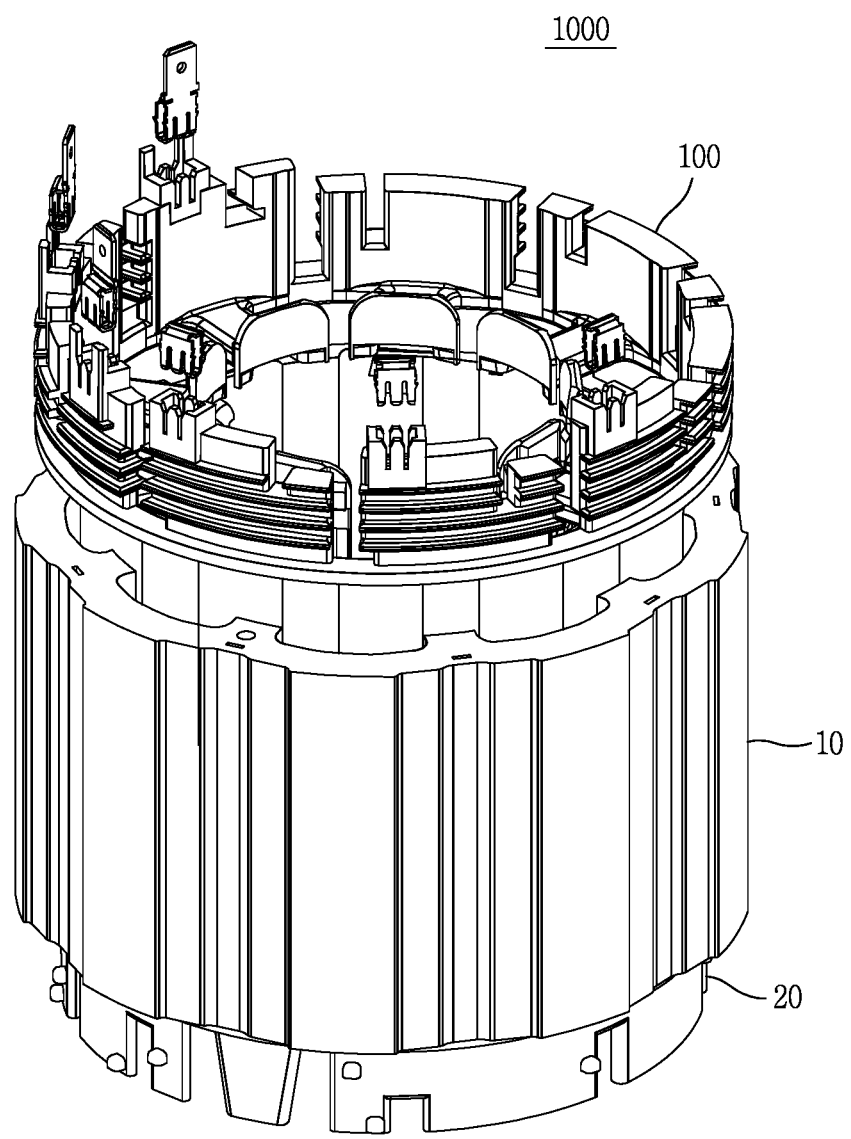
FIG. 1 is an exploded perspective view of an example stator and an example stator insulator coupled to the stator.

A stator insulator and a stator disclosed herein may be applied to an insulator or an assembly coupled to a stator core, or a stator including the same. Also, the present disclosure can be applied to a three-phase parallel connection (e.g., wiring) structure or a three-phase parallel connection method of a stator coil, a mechanism/circuit to which the three-phase parallel connection is applied, and the like. For instance, the present disclosure can be effectively applied to a concentrated winding brushless direct current (BLDC) motor for φ120 to 140 (an outer diameter of a stator) and its parallel connection method.

However, the technology disclosed in this specification is not limited thereto, and may be applied to all stator insulators, assemblies, stators to which the three-phase parallel connection is applied, or motors including the same, to which the technical idea of the technology is applicable, and the usage thereof may be variously applied without limitation.

Hereinafter, implementations of the present disclosure will be described in detail with reference to the accompanying drawings, and the same reference numerals are used to designate the same/like components and redundant description thereof may be omitted.

Hereinafter, detailed implementations of a stator insulator and a stator disclosed in this specification will be described with reference to the accompanying drawings.

A stator insulator 100 (hereinafter, referred to as an insulator) disclosed in this specification include an insulator or assembly coupled to a stator 1000, as illustrated in FIG. 1.

The insulator 100 is coupled to a top of a stator core 10.

In some examples, the insulator 100 may include an upper insulator or an upper assembly, which is coupled to the top of the stator core 10.

The stator core 10 to which the insulator 100 is coupled includes a core base having a shape of a circular ring, a plurality of teeth radially formed toward a center on an inner surface of the core base, and a tooth ear formed in a shape extending from ends of the plurality of teeth to both sides by a predetermined length.

A rotor is located in an inner direction of the tooth ear. For example, the rotor may be located at a position facing a center of the core base.

In some examples, the stator 1000 may be applied to an inner rotor type motor in which the rotor is rotated inside the stator core 10.

In some examples, the plurality of teeth may include nine teeth.

For instance, the plurality of teeth includes nine teeth, each of which is wound with a three-phase coil connected to a three-phase power supply.

In some implementations, the plurality of teeth may be formed such that the nine teeth are disposed at intervals of 40 degrees.

A coil corresponding to a U-phase of the three-phase power supply may be wound around three of the nine teeth, a coil corresponding to a V-phase of the three-phase power supply may be wound around another three of the nine teeth, and a coil corresponding to a W-phase of the three-phase power supply may be wound around the remaining three teeth.

For example, the plurality of teeth may be wound with three U-phase coils, three V-phase coils, and three W-phase coils.

In some examples, a lower insulator 20 may be coupled to a bottom of the stator core 10 and the insulator 100 is coupled to the top of the stator core 10.

The insulator 100 is coupled to the top of the stator core 10. The coils which are wound around the stator core 10 and drawn to the top of the stator core 10, namely, the insulator 100, are connected to the insulator 100.

Figure 2:
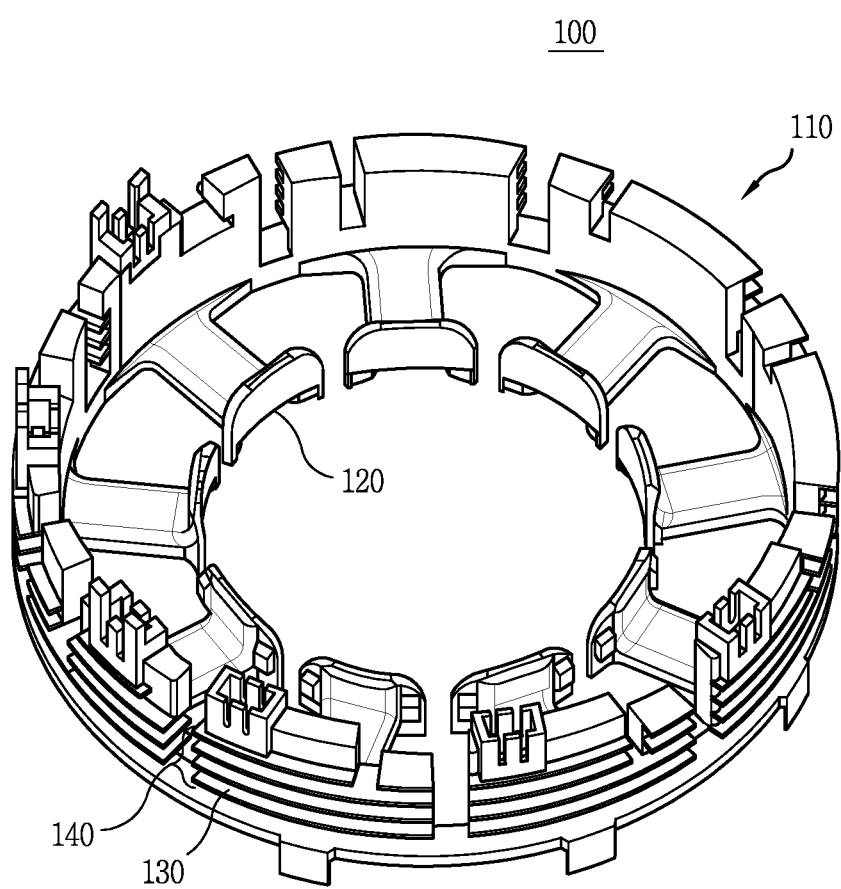
FIG. 2 is a perspective view illustrating an example configuration of the stator insulator illustrated in FIG. 1.

The insulator 100, as illustrated in FIG. 2, includes a plurality of insulating teeth 120 protruding toward a center portion of a main body 110 formed in a ring shape and coupled to a plurality of teeth of the stator core 10, respectively, and a plurality of guide tabs 130 protruding from an outer circumferential surface of the main body 110 to correspond to the plurality of insulating teeth 120 such that three-phase coils wound on the plurality of insulating teeth 120 and neutral coils of the respective three-phase coils are placed along the outer circumferential surface in a circumferential direction. Each of the guide tabs 130 is divided into a plurality of guide grooves 140 in which the three-phase coils and the neutral coils are mounted, respectively.

The main body 110 forming the outer appearance of the insulator 100 may be formed in the same ring shape as the stator core.

In some implementations, the main body 110 may have a shape which corresponds to an outer diameter of the stator core 10.

In some implementations, the insulator 100 may have an outer diameter equal to the outer diameter of the stator core 10, except for a portion protruding from the outer circumferential surface of the stator core 10.

Figure 3:
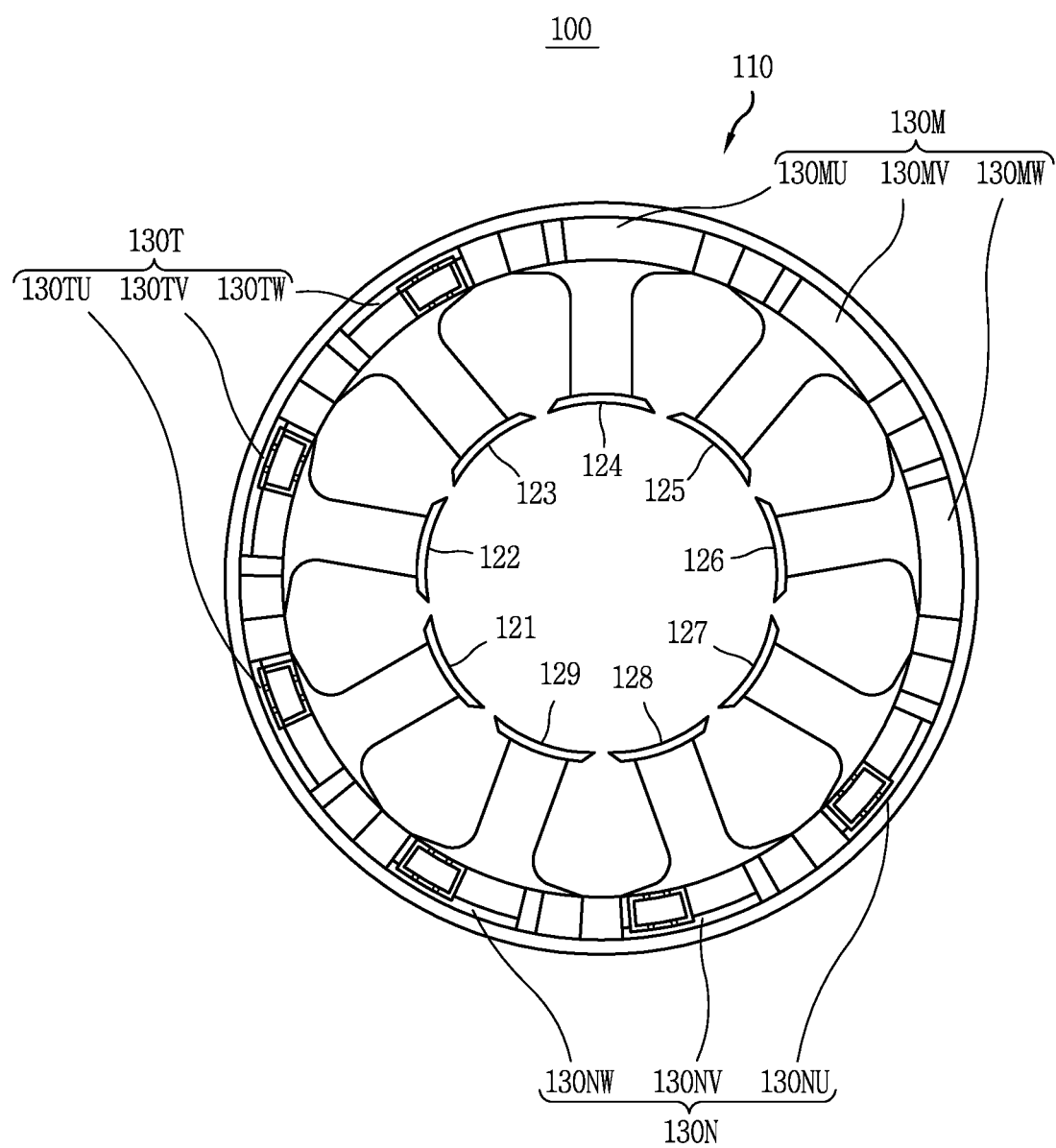
FIG. 3 is a planar view of the stator insulator illustrated in FIG. 2.

The insulator 100, as illustrated in FIG. 3, has a shape including a plurality of insulating teeth 120 (comprising individual insulating tooth 121 to 129) and a plurality of guide tabs 130 (130T, 130M, and 130N) on the main body 110 formed in a ring shape.

The plurality of insulating teeth 120 protrudes toward a center portion of the main body 110, namely, in an inner diameter direction of the main body 110, to be engaged with the plurality of teeth of the stator core, respectively.

The plurality of insulating teeth 120 may have a shape corresponding to contact surfaces of the plurality of teeth of the stator core, respectively.

The plurality of insulating teeth 120 may have a shape corresponding to the contact surfaces of the plurality of teeth of the stator core, and may be engaged with the plurality of teeth of the stator core 10 in a manner of contacting upper surfaces of the plurality of teeth of the stator core 10, respectively, when the insulator 100 is coupled to the top of the stator core 10.

The plurality of insulating teeth 120 include, for example, individual insulating tooth 121 to 129.

The plurality of insulating teeth 120 may be engaged with the plurality of teeth of the stator core 10 in a manner that the nine insulating teeth are spaced at predetermined intervals.

The plurality of insulating teeth 120, namely, the spaced nine insulating teeth may be formed in a manner of protruding at positions corresponding to arranged positions of the plurality of teeth of the stator core 10.

The plurality of insulating teeth 120, namely, the nine insulating teeth may be spaced apart from one another at spaced intervals of the plurality of teeth of the stator core 10. The plurality of insulating teeth 120 may be located at positions corresponding to the arranged positions of the plurality of teeth of the stator core 10 so as to be coupled to the plurality of teeth of the stator core 10, respectively.

In some implementations, the plurality of insulating teeth 120 may be formed such that nine insulating teeth are spaced apart at intervals of 40 degrees.

The plurality of insulating teeth 120 may be engaged with the plurality of teeth of the stator core 10 so that the three-phase coils can be wound.

The plurality of insulating teeth 120 may be coupled to the plurality of teeth of the stator core, so that the three-phase coils can be wound.

With regard to the plurality of insulating teeth 120, three insulating teeth 121, 124, and 127 of the nine insulating teeth may be wound with a coil corresponding to a U phase of the three-phase power source, another three insulating teeth 122, 125, and 128 may be wound with a coil corresponding to a V phase of the three-phase power source, and the remaining three insulating teeth 123, 126, and 129 may be wound with a coil corresponding to a W phase of the three-phase power source.

The plurality of guide tabs 130, which are tabs on which the three-phase coils wound on the plurality of insulating teeth and the neutral coils of the three-phase coils are placed and coupled, protrudes in an upper direction of the main body along the outer circumferential surface of the main body 110.

Each of the plurality of guide tabs 130 is formed in a shape that a front surface faces the outer circumferential surface of the main body 110, and a rear surface faces an inner circumferential surface of the main body 110, namely, the stator core 10 from which the three-phase coils and the neutral coil are drawn out.

The plurality of guide tabs 130 may protrude from the outer circumferential surface of the main body 110 at positions corresponding to the plurality of insulating teeth 120, and may be arranged on the same radius lines as the plurality of insulating teeth 120, respectively.

The plurality of guide tabs 130 may include nine individual guide tabs 130TU, 130TV, 130TW, 130MU, 130MV, 130MW, 130NU, 130NV, and 130NW, like the plurality of teeth.

The plurality of insulating teeth 121 to 129 may include (i) three insulating teeth 121, 124, and 127 that are wound with the coil corresponding to the U phase of the three-phase power source, (ii) three insulating teeth 122, 125, and 128 that are wound with the coil corresponding to the V phase, and (iii) remaining three insulating teeth 123, 126, and 129 that are wound with the coil corresponding to the W phase. The plurality of guide tabs 130 may include nine guide tabs including (i) three guide tabs 130TU, 130MU and 130NU that form the U phase, (ii) three guide tabs 130TV, 130MV and 130NV that form the V phase, and (iii) remaining three guide tabs 130TW, 130MW, and 130NW that form the W phase.

In some implementations, the insulator 100 may be configured such that the three-phase coils are wound on the nine insulating teeth 121 to 129 and the three-phase coils and the neutral coils are placed along the outer circumferential surface in the circumferential direction through the nine guide tabs 130TU, 130TV, 130TW, 130MU, 130MV, 130MW, 130NU, 130NV, and 130NW.

The plurality of guide tabs 130 may be arranged such that the nine guide tabs are spaced at predetermined intervals along the outer circumferential surface of the main body so as to correspond to the plurality of insulating teeth 120.

In some implementations, the plurality of guide tabs 130 may be configured such that the nine guide tabs 130TU, 130TV, 130TW, 130MU, 130MV, 130MW, 130NU, 130NV, and 130NW are arranged with being spaced apart from one another at intervals of 40 degrees on the outer circumferential surface of the main body 110.

The plurality of guide tabs 130 may have the same horizontal length.

Referring back to FIG. 2, the plurality of guide tabs 130 protrudes from the outer circumferential surface of the main body 110, namely, in an upper direction of the main body 110 to correspond to the plurality of insulating teeth 120, and a plurality of guide grooves 140 in which the three-phase coils and the neutral coil are placed is formed on a front portion of each of the guide tabs 130, namely, a surface facing the outer circumferential surface of the main body 110.

The plurality of guide grooves 140 may be formed on each of the plurality of guide tabs 130.

The plurality of guide grooves 140 may be formed along the outer circumferential surface.

The plurality of guide grooves 140 may be formed at the same height on the plurality of guide tabs 130, respectively.

Each of the plurality of guide tabs 130 is provided with the plurality of guide grooves 140 such that the three-phase coils and the neutral coils wound around the plurality of insulating teeth 120 are seated along the outer circumferential surface in the circumferential direction.

The three-phase coils and the neutral coils which are wound on the plurality of insulating teeth 120 and drawn out to the insulator 100 are drawn from a rear surface of the insulator 100, namely, the plurality of insulating teeth 120 to the outer circumferential surface so as to be seated on the plurality of guide grooves 140, respectively.

Each of the plurality of guide tabs 130 may be provided with the plurality of guide grooves 140 having the same height, such that the three-phase coils and the neutral coil can be seated along the outer circumferential surface in the circumferential direction.

A plurality of coils drawn out from the stator core 10 may be mounted on the plurality of guide grooves 140.

Nine three-phase coils and nine neutral coils drawn out from the stator core 10 may be mounted on the plurality of guide grooves 140.

Figure 4A:
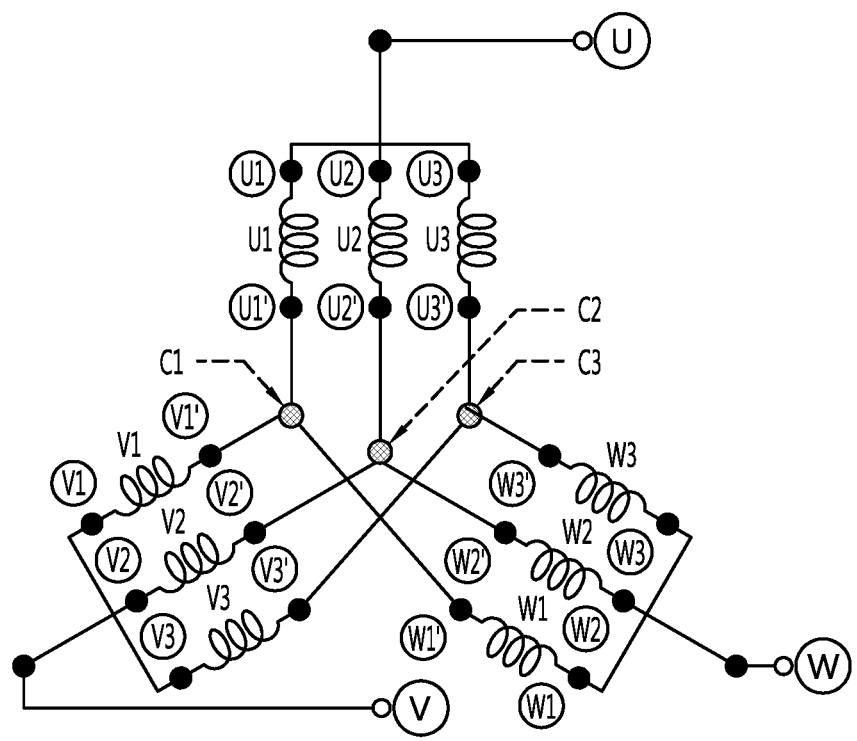
FIG. 4A is a view illustrating an example of a parallel connection applied to an example stator insulator.

In this manner, the insulator including the plurality of guide tabs provided with the plurality of guide grooves may be subjected to parallel connection (wiring), as illustrated in FIG. 4A, through the plurality of guide tabs.

The parallel connection (wiring) refers to a structure in which three phases U, V and, W branched in parallel into three U phases U1, U2 and U3, three V phases V1, V2 and V3 and three W phases W1, W2 and W3, respectively, and neutral wires U1', U2', U3', V1', V2', V3', W1', W2' and W3' of the branched nine phases are connected at three neutral points C1 and C2 And C3, so that three three-phase circuits [U1, V1 and W1], [U2, V2 and W3] and [U3, V3 and W3] are connected in parallel.

Figure 4B:
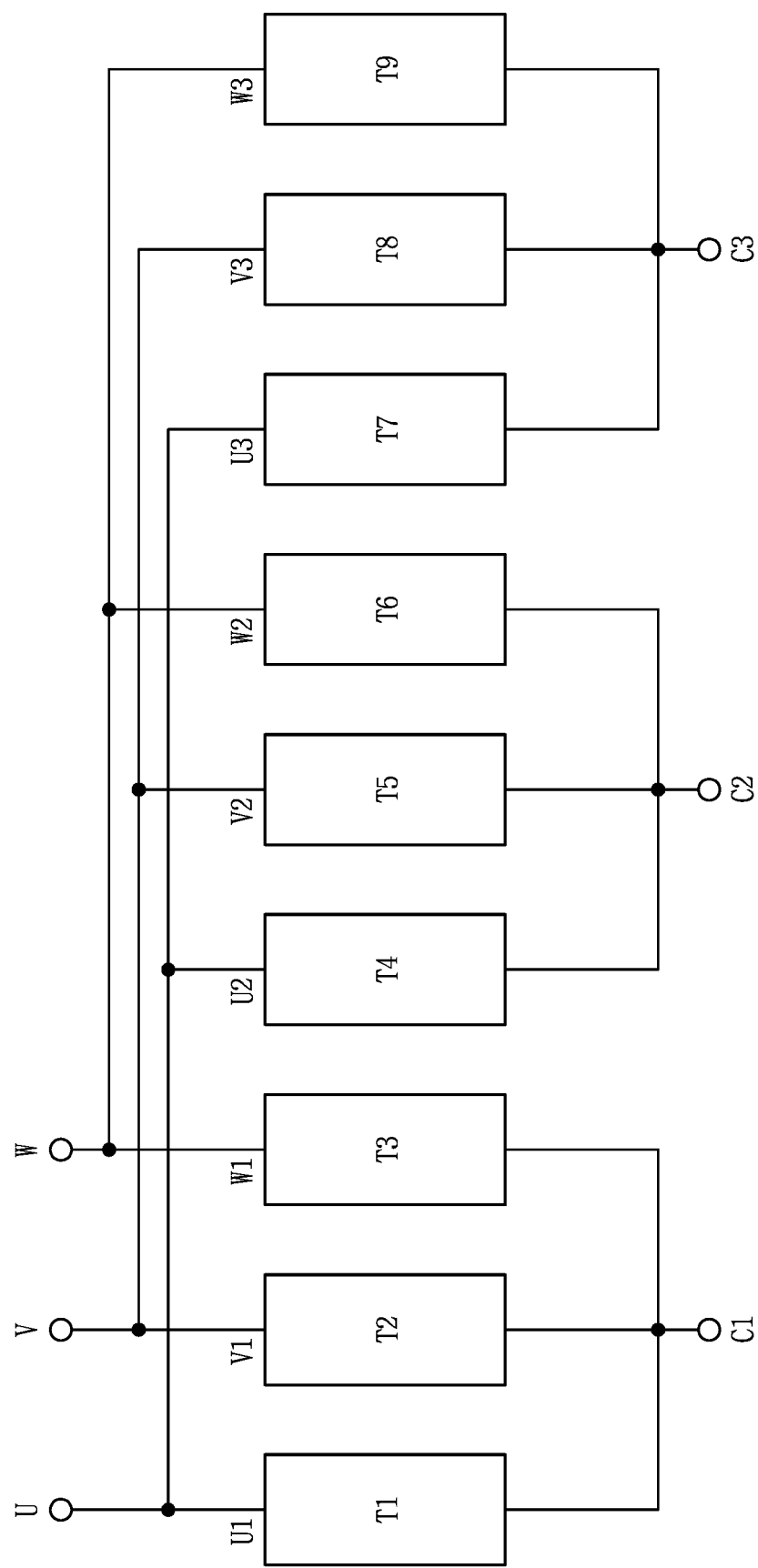
FIG. 4B is a structural view illustrating an example of a parallel connection of an example stator and an example stator insulator.

The structure of the parallel connection applied to the insulator is illustrated in FIG. 4B.

The parallel connection or wiring, as illustrated in FIG. 4B, may include (i) three coils U1, U2, and U3 corresponding to the U phase that are wound around respective three insulating teeth T1, T4, and T7, (ii) three coils V1, V2, and V3 corresponding to the V phase that are wound around another three insulating teeth T2, T5, and T8, and (iii) three coils W1, W2, and W3 corresponding to the W phase that are wound around the remaining three insulating teeth T3, T6 and T9. The coils corresponding to the phases U1, V1, and W1 of the coils that are wound around the respective insulating teeth T1 to T9 (i.e., the coils wound around the first to third insulating teeth T1 to T3) are connected at one neutral point C1. The coils corresponding to the phases U2, V2, and W2 (i.e., the coils wound around the fourth to sixth insulating teeth T4 to T6) are connected at another neutral point C2. The coils corresponding to the phases U3, V3, and W3 (i.e., the coils wound around the seventh to ninth insulating teeth T7 to T9) are connected at the other neutral point C3.

In some implementations, in the parallel connection, the U, V, and W-phase coils may be branched by three each, such that the three U-phase coils U1, U2, and U3 are wound on the respective three insulating teeth T1, T4, and T7 of the plurality of teeth, the three V-phase coils V1, V2, and V3 are wound on another three insulating teeth T2, T5, and T8, and the three W-phase coils W1, W2, and W3 are wound around the remaining three insulating teeth T3, T6, and T9. Then, the coils wound around the respective insulating teeth T1 to T9 are connected at the three neutral points C1, C2, and C3 by three each ([U1, V1 and W1], [U2, V2 and W3] and [U3, V3 and W3]). Accordingly, three three-phase circuits [U1, V1 and W1], [U2, V2 and W3] and [U3, V3 and W3] can be connected in parallel.

When the coils are connected to the stator core by the parallel connection as described above, the nine three-phase coils [U1, U2 and U3], [V1, V2 and V3] and [W1, W2 and W3] and the nine neutral coils [U1, U2 and U3], [V1, V2 and V3] and [W1, W2 and W3] corresponding to the three-phase coils are drawn out to the top of the stator core 10. The insulator 100 may include the plurality of guide tabs 130 having the plurality of guide grooves 140, so that the total 18 coils can be placed and connected through the plurality of guide tabs 130.

In some implementations, the insulator 100 may include the plurality of guide tabs 130 having the structure in which the 18 three-phase coils and neutral coils drawn out to the top of the stator core 10 are mounted and connected, which may facilitate the parallel connection on the top of the stator core 10.

In the insulator 100, the plurality of guide grooves 140 formed on the plurality of guide tabs 130 may have a structure in which when viewed from the perspective of the plurality of insulating teeth 120, the three-phase coils and neutral coils which are wound around the plurality of insulating teeth 120 and drawn out to the insulator 100 are seated along the outer circumferential surface in the circumferential direction.

Alternatively, when viewed from the perspective of the plurality of guide tabs 130, the plurality of guide grooves 140 may be branched from the plurality of guide tabs 130 to guide the three-phase coils and the neutral coils wound around the plurality of insulating teeth 120 to be seated along the outer circumferential surface in the circumferential direction.

Figure 5:
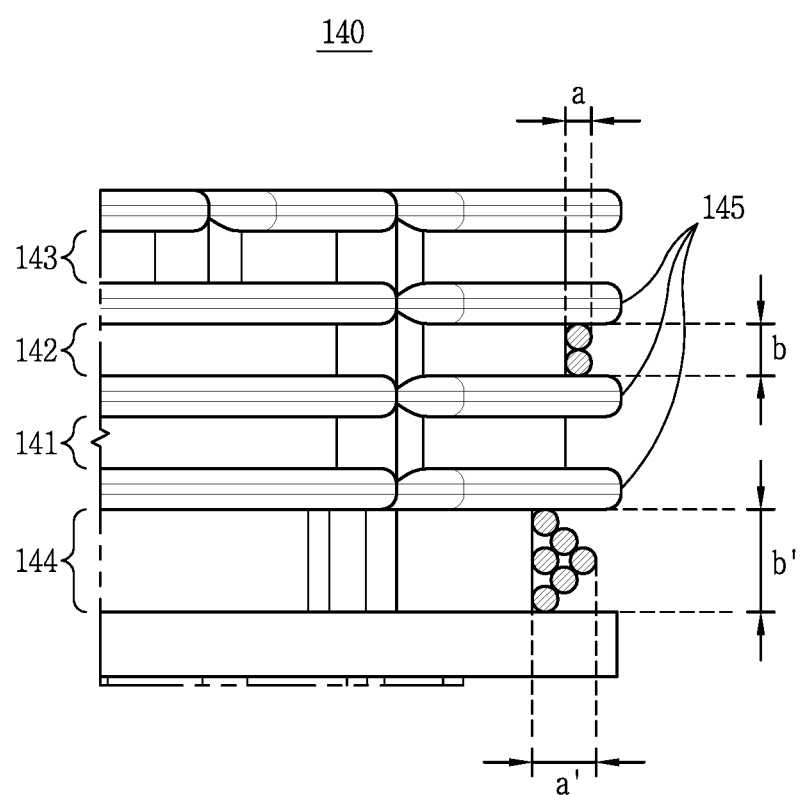
FIG. 5 is a front view illustrating an example guide groove defined at an example guide tab of an example stator insulator.

As illustrated in FIG. 5, the plurality of guide grooves 140 may be formed in a shape of being stacked along a height direction of the guide tab 130 toward an outer diameter direction of the main body 110.

The plurality of guide grooves 140 may alternatively be formed to protrude from a front surface of the guide tab 130 by predetermined widths or may be recessed into the front surface by predetermined widths.

The plurality of guide grooves 140 may be formed to have the same length as the horizontal length of the guide tab 130.

The plurality of guide grooves 140 may be formed in a curved shape on the front surface of the guide tab 130 along the outer surface of the guide tab 130, such that the three-phase coils and the neutral coil can be mounted along the outer circumferential surface in the circumferential direction.

Each of the plurality of guide grooves 140 may be provided with four steps of insulating layers 141 to 144 to make the three-phase coils and the neutral coil mounted at different heights.

In some implementations, the plurality of guide grooves 140 may be provided with four insulating layers 141 to 144 stacked along the height direction.

Each of the plurality of guide grooves 140 may have the neutral coil mounted on the lowermost insulating layer 144.

The plurality of guide grooves may be configured such that the three-phase coils are seated on the respective insulating layers 141 to 143 except for the lowermost insulating layer 144 on which the neutral coil is disposed.

For example, the neutral coil, the U-phase coil, the V-phase coil, and the W-phase coil may be mounted sequentially, starting from the lowermost insulating layer.

Each of the plurality of guide grooves 140 may include a neutral guide groove 144 on which the neutral coil is placed, and U, V and W-phase guide grooves 141 to 143 on which the three-phase coils are placed, respectively.

In some implementations, each of the plurality of guide grooves 140 may include the U, V and W-phase guide grooves 141 to 143, and the neutral guide groove 144, such that the three-phase coils and the neutral coil can be placed respectively on the U, V and W-phase guide grooves 141 to 143 and the neutral guide groove 144 at different heights.

Each of the plurality of guide grooves 140 may be formed such that the neutral guide groove 144 and the U, V and W-phase guide grooves 141 to 143 are stacked sequentially from a bottom.

Here, the U, V and W-phase guide grooves 141 to 143 may be stacked in a different order, or the three-phase coils may be placed on the U, V and W-phase guide grooves 141 to 143 in a different order.

The coil corresponding to the U-phase of the three-phase coils may be seated on the U-phase guide groove 141, the coil corresponding to the V-phase may be seated on the V-phase guide groove 142, and the coil corresponding to the W-phase may be seated on the W-phase guide groove 143.

In some implementations, the coils of the corresponding phases of the three-phase coils may be placed on the U, V and W-phase guide grooves 141 to 143 in a manner of being insulated from the coils of different phases.

Also, the neutral coil may be placed on the neutral guide groove 144 by being insulated from the three-phase coils.

The U, V and W-phase guide grooves 141 to 143 may be formed at the same height.

Each of the U, V and W-phase guide grooves 141 to 143 may have a height b at which at least two coils are mounted.

In some implementations, each of the U, V, and W-phase guide grooves 141 to 143 may have a height b at which at least two coils are seated, so that at least two coils can be vertically seated.

Each of the U, V and W-phase guide grooves 141 to 143 may be formed to have a height "b," which is 2.5 times or more of a wire diameter of the three-phase coil.

Each of the U, V, and W-phase guide grooves 141 to 143 may also have a width "a," which is 1.5 times or more of the wire diameter of the three-phase coil.

Each of the U, V, and W-phase guide grooves 141 to 143 may also have an area (a×b) which is 3.75 times or more of the wire diameter of the three-phase coil.

In some implementations, each of the U, V and W-phase guide grooves 141 to 143 may be formed to have an area in which maximum two coils are seated. Here, the area may be great enough for two coils to be mounted without a gap so as to restrict displacement that the mounted two coils are movable.

The neutral guide groove 144 may have a height b' at which at least three coils are seated.

In some implementations, the neutral guide groove 144 is formed to have the height b' at which at least three coils are seated, so that such at least three coils can be vertically seated.

The neutral guide groove 144 may be formed to have the height b' that is three times or more of the wire diameter of the neutral coil.

The neutral guide groove 144 may also be formed to have a width a' that is three times or more of the wire diameter of the neutral coil.

The neutral guide groove 144 may also be formed to have an area (a'×b') which is 9 times or more of the wire diameter of the neutral coil.

In some implementations, the neutral guide groove 144 may have an area in which maximum six coils are seated. Here, the area may be great enough for six coils to be mounted without a gap so as to restrict displacement that the mounted six coils are movable.

The plurality of guide grooves 140 may be insulated with being spaced apart by predetermined distances or more.

The plurality of guide grooves 140 may have insulating layers 145, respectively, having a predetermined height between neighboring guide grooves.

Each insulating layer 145 may protrude along an outer circumferential direction between the plurality of guide grooves 140.

As described above, the plurality of guide grooves 140 may be provided with the insulating layers 145 each having a predetermined height between the neighboring guide grooves, thereby more safely insulating the three-phase coils and the neutral coil mounted on the plurality of guide grooves 140, respectively.

The plurality of guide grooves 140 may be formed on each of the plurality of guide tabs 130, so that the three-phase coils and the neutral coil wound around the plurality of insulating teeth 120 can be seated along the outer circumferential surface.

As the plurality of guide grooves 140 is formed, the plurality of guide tabs 130, on which the three-phase coils and the neutral coils are mounted along the outer circumferential surface in the circumferential direction, may have the three-phase coils and the neutral coils mounted on different structures.

The plurality of guide tabs 130 may perform different functions, respectively, in the structure in which the three-phase coils and the neutral coil are seated.

Referring back to FIG. 3, the plurality of guide tabs 130 may be nine guide tabs 130TU, 130TV, 130TW, 130MU, 130MV, 130MW, 130NU, and 130NV and 130NW, which are formed on the outer circumferential surface with intervals of 40° in a clockwise direction with respect to one point (130TU) on the outer circumferential surface.

The plurality of guide tabs 130 may be first to ninth guide tabs 130TU, 130TV, 130TW, 130MU, 130MV, 130MW, 130NU, 1309NV, and 130NW, which are formed with the intervals of 40° in the clockwise direction from one point on the outer circumferential surface, so as to perform different functions.

In some implementations, the insulator may be configured such that the first to ninth guide tabs 130TU, 130TV, 130TW, 130MU, 130MV, 130MW, 130NU, 130NV, and 130NW are spaced apart from one another at the intervals of 40° in the clockwise direction on the outer circumferential surface.

The first to ninth guide tabs 130TU, 130TV, 130TW, 130MU, 130MV, 130MW, 130NU, 130NV, and 130NW may be formed at positions corresponding to the first to ninth insulating teeth 121 to 129, respectively.

An insulating tooth corresponding to each of the first to ninth guide tabs 130TU, 130TV, 130TW, 130MU, 130MV, 130MW, 130NU, 130NV, and 130NW may be wound with a coil corresponding to one of the three phases.

Referring to FIGS. 3 and 4B together, for example, the U-phase coils U1, U2, and U3 may be wound around the first insulating teeth 121 (T1), the fourth insulating teeth 124 (T4), and the seventh insulating teeth 127 (T7) which correspond to the first guide tab 130TU, the fourth guide tab 130MU, and the seventh guide tab 130NU, the V-phase coils V1, V2, and V3 may be wound around the second insulating teeth 122 (T2), the fifth insulating teeth 125 (T5), and the eighth insulating teeth 128 (T8) which correspond to the second guide tab 130TV, the fifth guide tab 130MV, and the eighth guide tab 130NV, and the W-phase coils W1, W2, and W3 may be wound around the third insulating teeth 123 (T3), the sixth insulating teeth 126 (T6), and the ninth insulating teeth 129 (T9) which correspond to the third guide tab 130TW, the sixth guide tab 130MW, and the ninth guide tab 130NW.

In some implementations, the U-phase coils U1, U2, and U3 may be wound around the first guide tab 130TU, the fourth guide tab 130MU, and the seventh guide tab 130NU, the V-phase coils V1, V2, and V3 may be wound around the second guide tab 130TV, the fifth guide tab 130MW, and the eight guide tab 130NV, and the W-phase coils W1, W2, and W3 may be wound around the third guide tab 130TW, the sixth guide tab 130MW, and the ninth guide tab 130NW, thereby implementing a parallel structure of the U, V and W-phases.

The plurality of guide tabs 130 which are nine tabs may be formed in different shapes.

In some implementations, the first to ninth guide tabs 130TU, 130TV, 130TW, 130MU, 130MV, 130MW, 130NU, 130NV, and 130NW may have different shapes.

For example, the first to third guide tabs 130TU, 130TV, and 130TW may be formed respectively as illustrated in FIGS. 12A to 14B, the fourth to sixth guide tabs 130MU, 130MV, and 130MW may be formed respectively as illustrated in FIGS. 15A to 17B, and the seventh to ninth guide tabs 130NU, 130NV and 130NW may be formed respectively as illustrated in FIGS. 18A to 20B.

A detailed shape of each of the plurality of guide tabs 130 will be described later.

Referring back to FIG. 3, the plurality of guide tabs 130 may include a plurality of three-phase terminal tabs 130T (130TU, 130TV, and 130TW) on which the three-phase power source and the three-phase coils branched from the three-phase power source are connected, a plurality of middle tabs 130M (130NM, 130MV, and 130MW) through which the three-phase coils and the neutral coils pass, and a plurality of neutral tabs 130N (130NU, 130NV, and 130NW) on which the neutral coils are connected.

In some implementations, the plurality of guide tabs 130 may include three three-phase terminal tabs 130T (130TU, 130TV and 130TW), three middle tabs 130M (130MU, 130MV and 130MW) and three neutral tabs 130N (130NU, 130NV and 130NW).

In some implementations, the plurality of guide tabs 130 may include three guide tab groups, namely, the plurality of three-phase terminal tabs 130T (130TU, 130TV and 130TW), the plurality of middle tabs 130M (130MU, 130MV and 130MW), and the plurality of neutral tabs 130N (130NU, 130NV and 130NW), which are sequentially disposed in a clockwise direction from one point.

The plurality of three-phase terminal tabs 130T are tabs where the connection of the three-phase power source and the three-phase coils is made, and may correspond to a mounting start point of the three-phase coils.

The plurality of middle tabs 130M are tabs where the mounting of the three-phase coils and the neutral coils is made between the plurality of three-phase terminal tabs 130T and the plurality of neutral tabs 130N, and may correspond to a mounting pass-through point of the three-phase coils and the neutral coils.

The plurality of neutral tabs 130N may be tabs where the connection of the neutral coils is made, and may correspond to a mounting end point of the three-phase coils and the neutral coils.

Each group of the plurality of three-phase terminal tabs 130T, middle tabs 130M and neutral tabs 130N may include tabs which correspond to an insulating tooth corresponding to the U-phase coil, an insulating tooth corresponding to the V-phase, and an insulating tooth corresponding to the W-phase.

Each group of the plurality of three-phase terminal tabs 130T, middle tabs 130M and neutral tabs 130N may be configured such that the U, V and W-phase coils are wound around the corresponding teeth so as to form one three-phase parallel circuit.

Figure 6A:
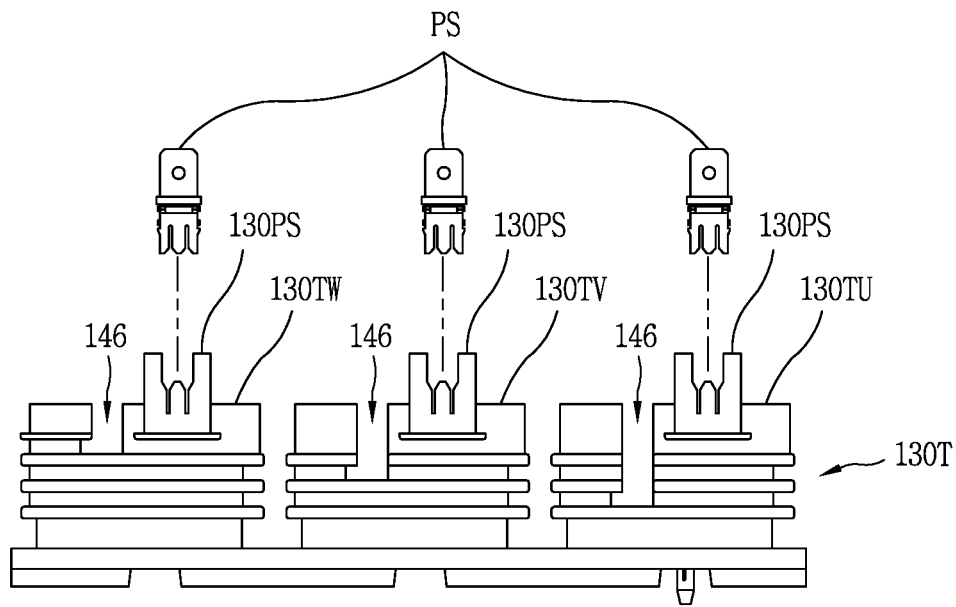
FIG. 6A is a front view illustrating an example three-phase terminal tab of an example stator insulator.
Figure 6B:
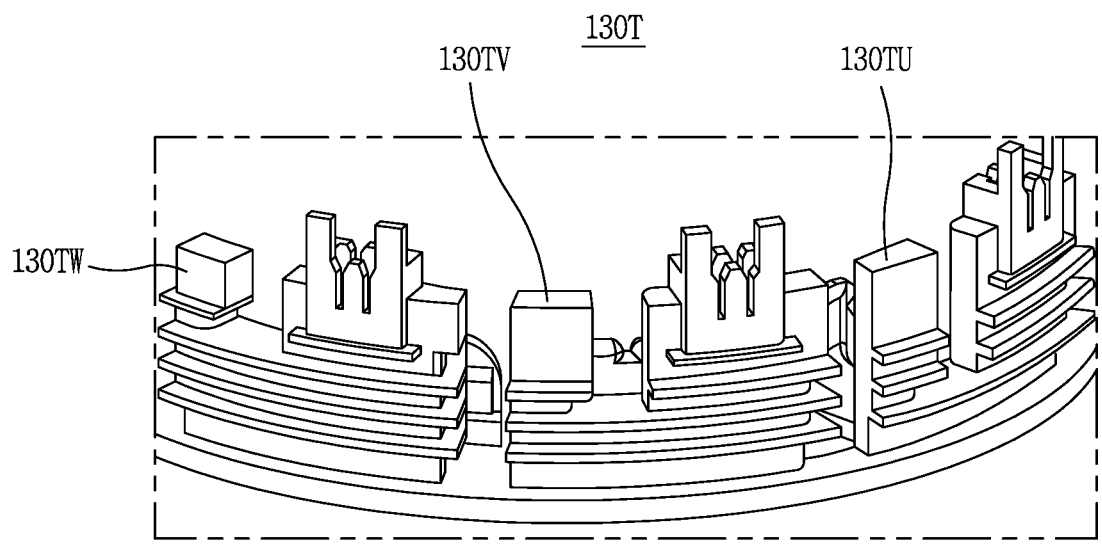
FIG. 6B is a perspective view of the three-phase terminal tab illustrated in FIG. 6A.
Figure 7A:
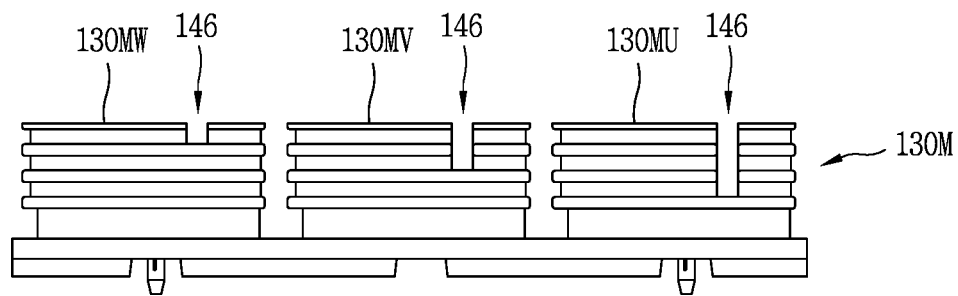
FIG. 7A is a front view illustrating an example middle tab of an example stator insulator.
Figure 7B:
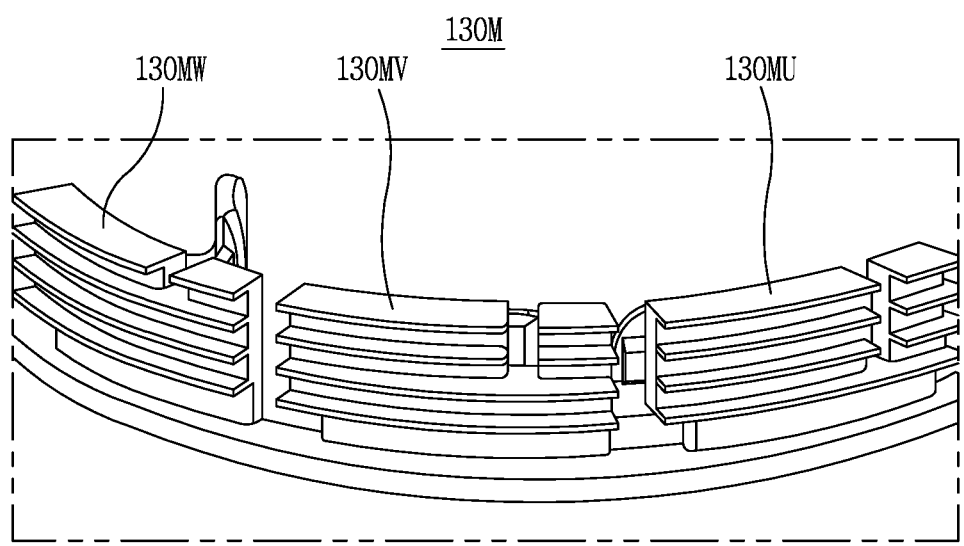
FIG. 7B is a perspective view of the middle tab illustrated in FIG. 7A.
Figure 8A:
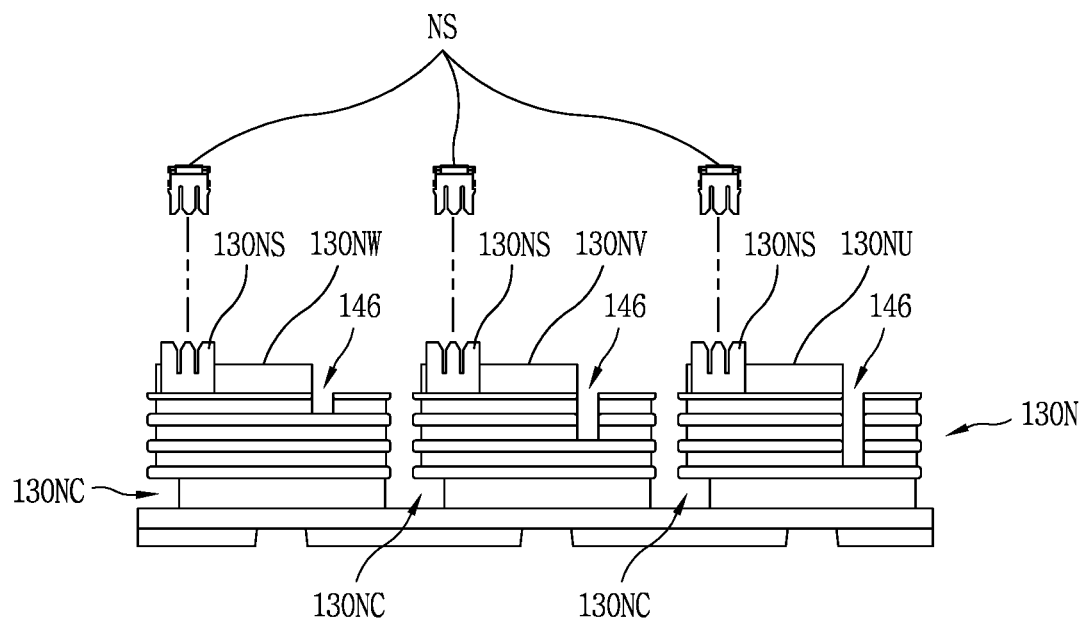
FIG. 8A is a front view illustrating an example neutral tab of an example stator insulator.
Figure 8B:
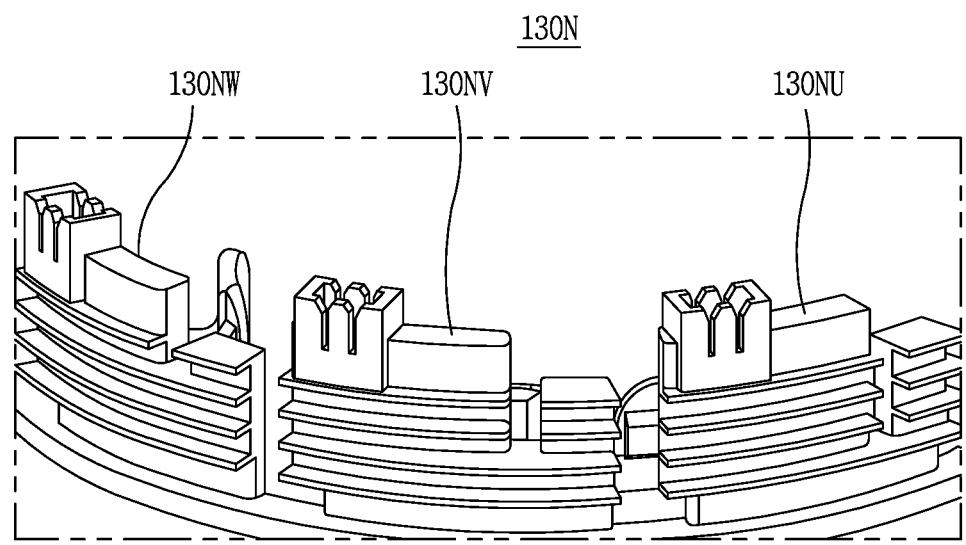
FIG. 8B is a perspective view of the neutral tab illustrated in FIG. 8A.

The plurality of three-phase terminal tabs 130T may be formed as illustrated in FIGS. 6A and 6B, the plurality of middle tabs 130M may be formed as illustrated in FIGS. 7A and 7B, and the plurality of neutral tabs 130N may be formed as illustrated in FIGS. 8A and 8B.

The plurality of three-phase terminal tabs 130T as illustrated in FIG. 6A may be formed in an arcuate shape along the outer circumferential surface as illustrated in FIG. 6B. The plurality of middle tabs 130M as illustrated in FIG. 7A may be formed in an arcuate shape along the outer circumferential surface as illustrated in FIG. 7B. The plurality of neutral tabs 130N as illustrated in FIG. 8A may be formed in an arcuate shape along the outer circumferential surface as illustrated in FIG. 8B.

Each of the plurality of guide tabs 130 including the plurality of three-phase terminal tabs 130T, middle tabs 130M and neutral tabs 130N may be provided with a three-phase coil groove 146 formed at one side thereof such that the three-phase coils are drawn out in an outer diameter direction of the main body 110 or inserted in an inner diameter direction of the main body 110.

The three-phase coil groove 146 may be a bending portion at which the three-phase coils mounted on each guide tab 130 are bent from the guide groove 140 to the rear surface of the guide tab 130 or from the rear surface of the guide tab 130 to the guide groove 140.

In some implementations, the three-phase coils may be mounted and connected through the three-phase coil grooves 146 of the plurality of guide tabs 130, respectively.

The three-phase coils bent through the three-phase coil grooves 146 may be wound perpendicularly on the plurality of insulating teeth 120 at a lower portion of the plurality of guide tabs 130.

In some implementations, the three-phase coils may be bent toward the lower portion of the guide tab 130 through the three-phase coil groove 146 and perpendicularly wound around the corresponding insulating tooth.

The three-phase coil grooves 146 may be formed at heights of the guide grooves 140 corresponding to the phases of the insulating teeth corresponding to the plurality of guide tabs 130T, 130M, and 130N, respectively.

For example, as illustrated in FIGS. 6A, 7A, and 8A, the tabs 130TU, 130MU, and 130NU corresponding to the U-phase teeth may be formed at a height of the guide groove 141 on which the U-phase coil is mounted, the tabs 130TV, 130MV, and 130NV corresponding to the V-phase teeth may be formed at the height of the guide groove 142 on which the V-phase coil is mounted, and the tabs 130TW and 130MW and 130NW corresponding to the W-phase teeth may be formed at the height of the guide groove 143 on which the W-phase coil is mounted.

As illustrated in FIG. 6A, each of the three-phase terminal tabs 130T may have the three-phase coil groove 146 formed at a side surface of a direction that the three-phase coils are mounted to the neighboring guide tab.

In some implementations, when the direction that the three-phase coils are mounted to the neighboring guide tab is a left side, the three-phase coil groove 146 may be formed on a left side surface of the tab. On the other hand, when the direction that the three-phase coils are mounted to the neighboring guide tab is a right side, the three-phase coil groove 146 may be formed on a right side surface of the tab.

Here, the direction that the three-phase coils are mounted or seated may mean a direction in the aspect that the three-phase coils start to be seated from the plurality of three-phase terminal tabs 130T.

In some implementations, the three-phase coil groove 146 formed on each of the plurality of three-phase terminal tabs 130T may be formed on the left side surface when viewing the three-phase terminal tab 130T from the front.

As shown in FIGS. 7A and 8A, each of the plurality of middle tabs 130M and neutral tabs 130N may be provided with the three-phase coil groove 146 on its side surface of a direction that the three-phase coils are mounted from the adjacent guide tab.

In some implementations, when the direction in which the three-phase coils are seated from the neighboring guide tab is a right side, the three-phase coil groove 146 may be formed on a right side surface of the tab. On the other hand, when the direction in which the three-phase coils are seated from the neighboring guide tab is a left side, the three-phase coil groove 146 may be formed on a left side surface of the tab.

In some implementations, the three-phase coil groove 146 formed on each of the plurality of middle tabs 130M and neutral tabs 130N may be formed on the right side surface when viewing the middle tab 130M and the neutral tab 130N from the front.

Each of the plurality of three-phase terminal tabs 130T, as illustrated in FIG. 6A, may be provided with power terminal coupling grooves 130PS formed on an upper portion thereof. A power terminal PS to which the three-phase power source and the three-phase coils are connected may be coupled to each of the power terminal coupling grooves 130PS.

Figure 9A:
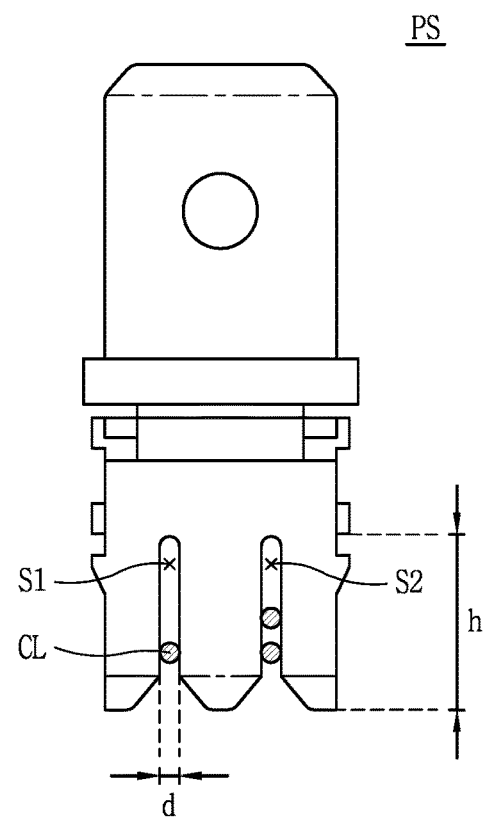
FIG. 9A is an exemplary view illustrating an example shape of a power terminal of an example stator insulator.

The power terminal PS may be formed as shown in FIG. 9A.

The power terminal PS may be a slot to which the three-phase power source and the three-phase coils are connected.

The three three-phase coils may be connected to the power terminal PS.

The power terminal PS may be coupled to the power terminal coupling groove 130PS formed on each of the plurality of three-phase terminal tabs 130T, so that the three-phase power source and the three-phase coils can be connected on a rear surface of the three-phase terminal tab 130T.

As shown in FIG. 8B, each of the plurality of neutral tabs 130N may be provided with neutral terminal coupling grooves 130NS formed on an upper portion thereof. A neutral terminal NS to which the neutral coils are connected is coupled to each of the neutral terminal coupling grooves 130NS.

Figure 10A:
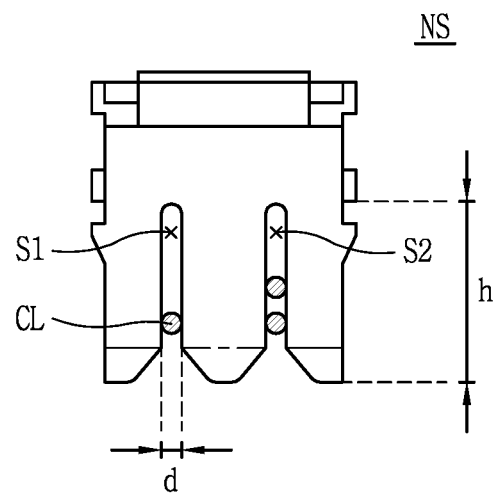
FIG. 10A is a view illustrating an example shape of an example neutral terminal of an example stator insulator.

The neutral terminal NS may be formed as shown in FIG. 10A.

The neutral terminal NS may be a slot through which the neutral coils of the U, V, and W phase coils are connected.

the three neutral coils may be connected to the neutral terminal NS.

The neutral terminal NS is coupled to the neutral terminal coupling groove 130NS formed on each of the plurality of neutral tabs 130N, so that the neutral coils can be connected on the rear surface of each of the plurality of neutral tabs 130N.

Each of the power terminal PS and the neutral terminal NS, as illustrated in FIGS. 9A and 10A, may be provided with a plurality of slots S1 and S2 to which the coils are connected.

In some implementations, each of the power terminal PS and the neutral terminal NS may be provided with two slots S1 and S2.

One coil CL may be connected to one slot S1 of the plurality of slots S1 and S2, and the remaining coil may be connected to another slot S2.

The coil CL wound around the coupled insulating tooth may be connected to the one slot S1 of the power terminal PS and the remaining coil may be connected to another coil S2. Accordingly, the connected coils can be placed on the plurality of guide grooves 140.

The plurality of slots S1 and S2 may have a height h at which at least two coils are connected and a width d at which at least one coil is connected.

The plurality of slots S1 and S2 may be formed with a height and a width of a predetermined ratio with respect to the wire diameter of the three-phase coil.

The plurality of slots S1 and S2 may be formed with a width of 0.6 times or more and 0.7 times or less of the (wire) diameter of the three-phase coil, and a height of 3 times or more and 5 times or less of the wire diameter of the three-phase coil.

In some implementations, each of the plurality of slots S1 and S2 may have an area in which two coils are connected vertically, namely, an area in which two coils are connected without an air gap so as to restrict the displacement that the two coils are movable.

Each of the plurality of neutral tabs 130N, as illustrated in FIG. 8A, may be provided with neutral coil grooves 130NC formed at one side of the lowermost guide groove 144 such that the neutral coil is drawn out in an outer diameter direction of the main body 110 or inserted in an inner diameter direction of the main body 110.

The neutral coil groove 130NC may be a bending portion where the neutral coil mounted on each of the plurality of neutral tabs 130N is bent from the lowermost guide groove 144 to a rear surface of the neutral tab 130N or from the rear surface of the neutral tab 130N to the lowermost guide groove 144.

In other words, the neutral coil may be mounted and connected through the neutral coil groove 130NC of each of the plurality of neutral tabs 130N.

The neutral coil bent through the neutral coil groove 130NC may be connected perpendicularly to the neutral terminal NS at an upper portion of each of the plurality of neutral tabs 130N.

In some implementations, the neutral coil is bent to the upper side of the neutral tab 130N through the neutral coil groove 130NC, so as to be perpendicularly connected to the neutral terminal NS coupled to the upper portion of the neutral tab 130N.

Figure 9B:
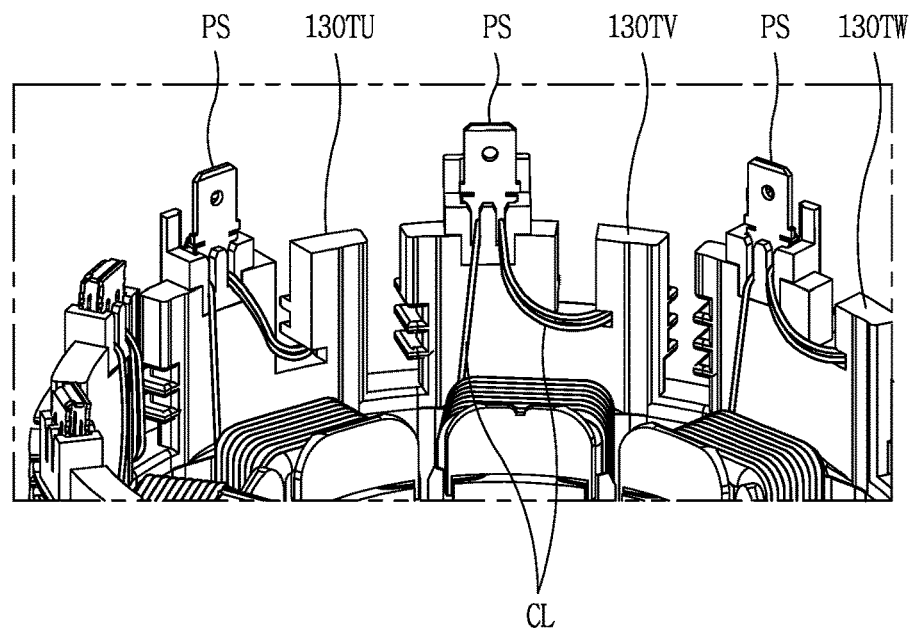
FIG. 9B is a view illustrating an example of coupling and connection of the power terminal illustrated in FIG. 9A.
Figure 10B:
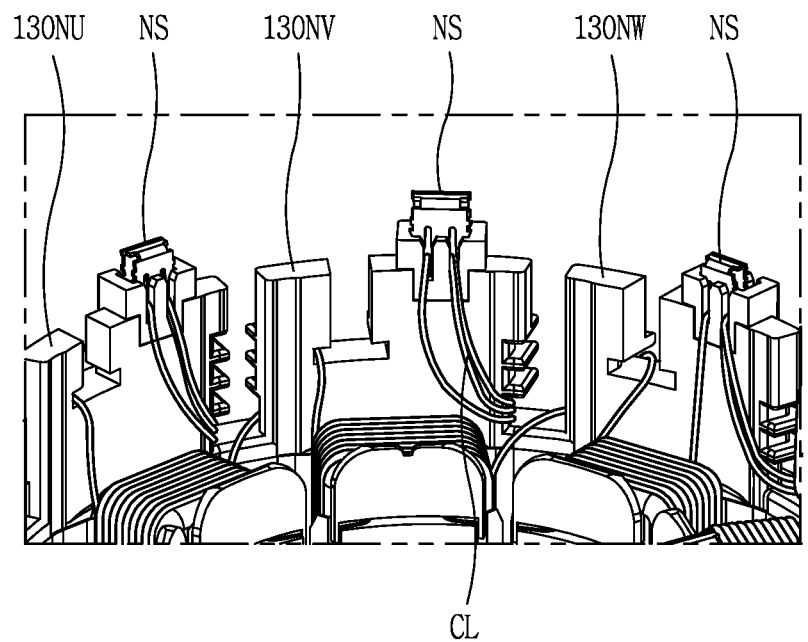
FIG. 10B is an exemplary view illustrating an example of coupling and connection of the neutral terminal illustrated in FIG. 10B.

The coupling and connection of the power terminal PS and the neutral terminal NS may be made as shown in FIGS. 9B and 10B.

The power terminal PS, as illustrated in FIG. 9B, may be coupled to the power terminal coupling groove 130PS of each of the plurality of three-phase terminal tabs 130T. The coil CL wound around the coupled insulating tooth may be connected to the one slot S1 and the remaining coil may be connected to the another slot S2 so as to be mounted on the guide groove 140 of the right neighboring guide tab through the three-phase coil groove 146.

In this case, the one coil CL connected to the one slot S1 may be linearly connected from the wound insulating tooth to the power terminal PS, and the other coil CL connected to the another slot S2 may be drawn out to the front surface of the neighboring guide tab through the three-phase coil groove 146 so as to be mounted on the guide groove 140 of the right neighboring guide tab.

As shown in FIG. 10B, the neutral terminal NS, as illustrated in FIG. 10B, may be coupled to the neutral terminal coupling groove 130NS of each of the plurality of neutral tabs 130N, so that the neutral coil mounted on the neutral guide groove 144 may be connected to each of the slot S1 and the slot S2 through the neutral coil groove 130NC.

Here, in case of the neutral terminal NS coupled to the rightmost neutral tab 130NW, one coil CL may be linearly connected to the one slot S1 of the neutral terminal NS from the wound insulating tooth, and the another coil CL may be drawn in toward the rear surface of the neutral tab 130NW through the neutral coil groove 130NC to be connected to the another slot S2 of the neutral terminal NS.

Figure 11:
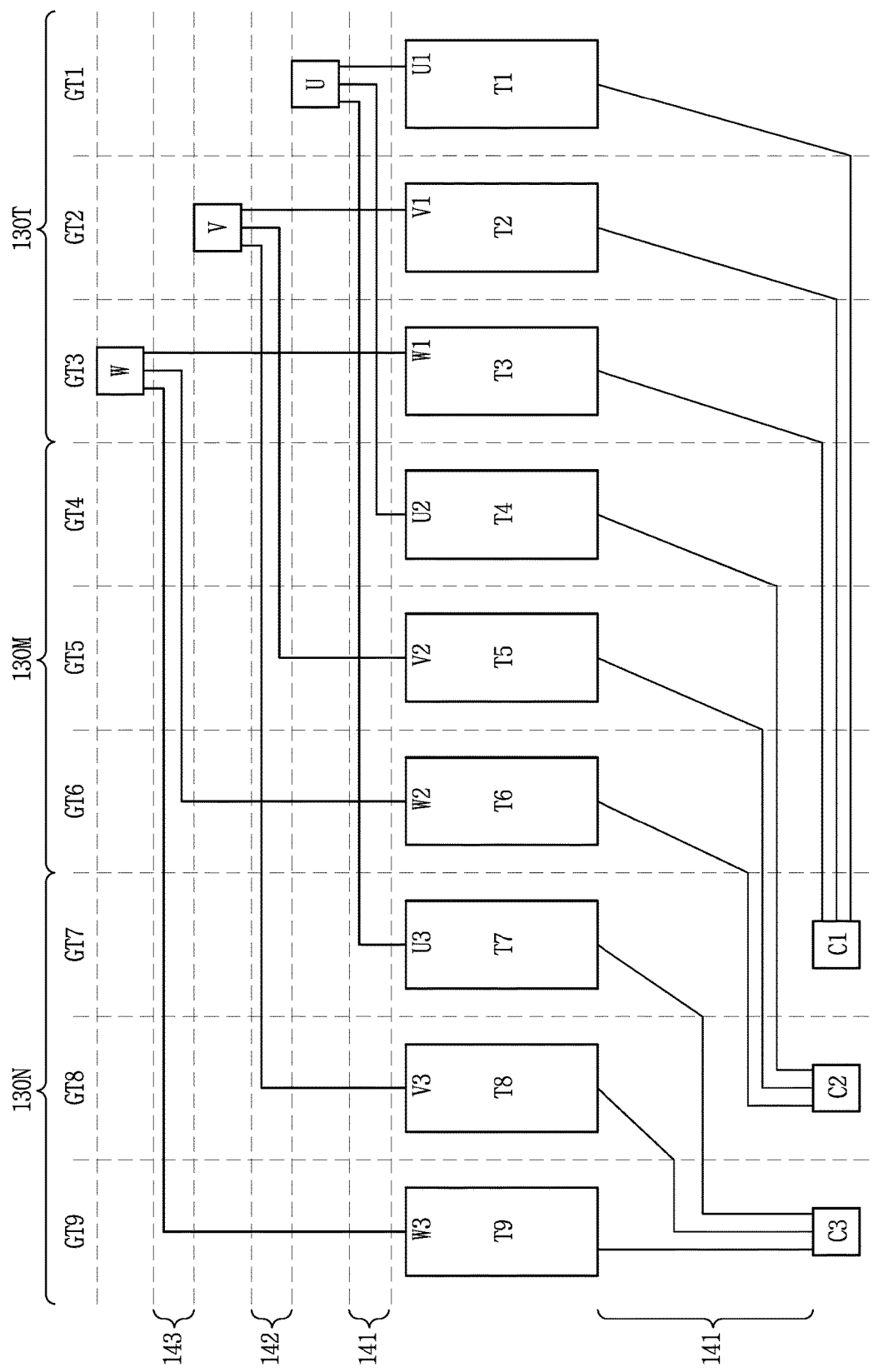
FIG. 11 is a view illustrating an example of a mounting and connecting structure of a three-phase coil and a neutral coil in each of guide tabs of an example stator insulator.

Hereinafter, description will be given of a shape of each of the plurality of guide tabs 130 and the connection structure of the three-phase coils and the neutral coil in each of the plurality of guide tabs 130, with reference to FIG. 11.

As illustrated in FIGS. 6A and 6B, the plurality of three-phase terminal tabs 130T may include a U-phase terminal tab 130TU where the U-phase of the three-phase power source and the U-phase coil of the three-phase coils are connected, a V-phase terminal tab 130TV where the V-phase of the three-phase power source and the V-phase coil of the three-phase coils are connected, and a W-phase terminal tab 130TW where the W-phase of the three-phase power source and the W-phase coil of the three-phase coils are connected.

Figure 12A:
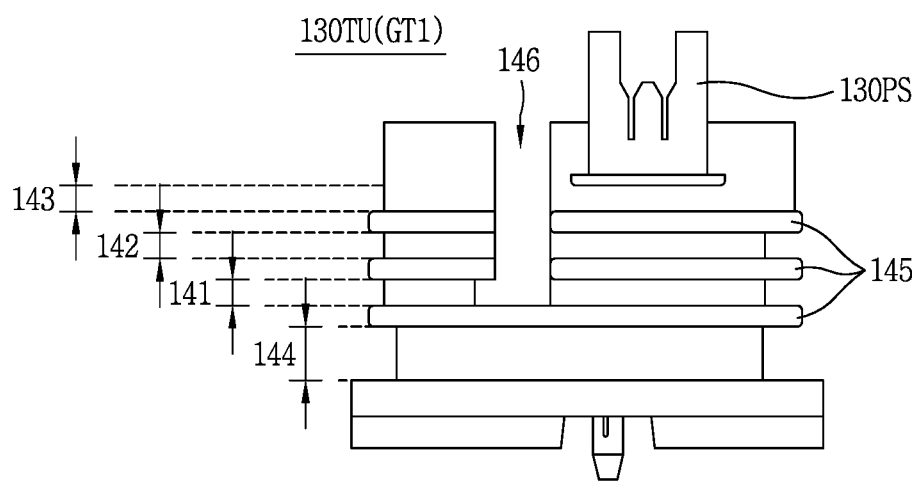
FIG. 12A is a front view of an example U-phase terminal tab of an example stator insulator.

The U-phase terminal tab 130TU may be formed as shown in FIG. 12A.

Figure 12B:
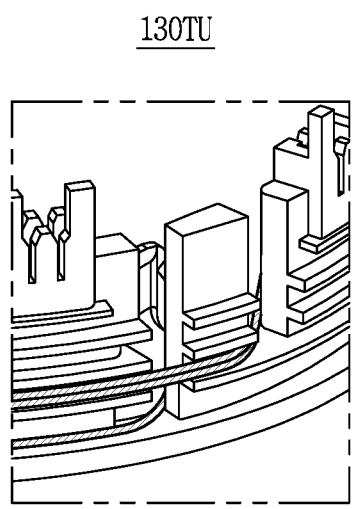
FIG. 12B is a perspective view of the U-phase terminal tab illustrated in FIG. 12A.

The U-phase terminal tab 130TU as shown in FIG. 12A may be formed in an arcuate shape along the outer circumferential surface as shown in FIG. 12B.

The guide groove 140 of the U-phase terminal tab 130TU may be formed in the aforementioned shape.

The U-phase terminal tab 130TU is a tab corresponding to the first guide tab 130TU (GT1). The U-phase power source of the three-phase power source may be connected to the U-phase terminal tab 130TU, and U-phase coils may be branched from the U-phase power source.

The U-phase power source and three U-phase coils may be connected at the U-phase terminal tab 130TU.

In some implementations, at the U-phase terminal tab 130TU, three U-phase coils may be branched and wound around the three insulating teeth T1, T4, and T7.

The U-phase coil may be wound around the insulating tooth T1 corresponding to the U-phase terminal tab 130TU.

The U-phase terminal tab 130TU may be provided with the three-phase coil groove 146 formed on a left side thereof, and the power terminal coupling groove 130PS formed on an opposite side of the three-phase coil groove 146.

The U-phase terminal tab 130TU may be formed such that the three-phase coil groove 146 is formed at a height of the U-phase guide groove 141 and the power terminal PS connected to the U-phase power source is coupled to the power terminal coupling groove 130PS.

The U-phase power source may be connected to the U-phase terminal tab 130TU through the power terminal PS coupled to the power terminal coupling groove 130PS, and the three U-phase coils may be branched from the U-phase power source.

One of the U-phase coils may be wound on the insulating tooth T1 corresponding to the U-phase terminal tab 130TU and the other two may be placed on the U-phase guide groove 141 through the three-phase coil groove 146 to extend to the V-phase terminal tab 130TV.

The coil wound on the insulating tooth T1 corresponding to the U-phase terminal tab 130TU may be a coil connected to the left slot of the power terminal PS when viewed from the rear surface of the U-phase terminal tab 130TU. The two coils placed on the U-phase guide groove 141 through the three-phase coil groove 146 may be coils connected to the right slot of the power terminal PS, namely, the slots adjacent to the three-phase coil groove 146 when viewed from the rear surface of the U-phase terminal tab 130TU.

In this manner, the U-phase terminal tab 130TU may be formed, as illustrated in FIG. 12B, such that the two U-phase coils bent at the three-phase coil groove 146 may be mounted on the U-phase guide groove 141.

Figure 13A:
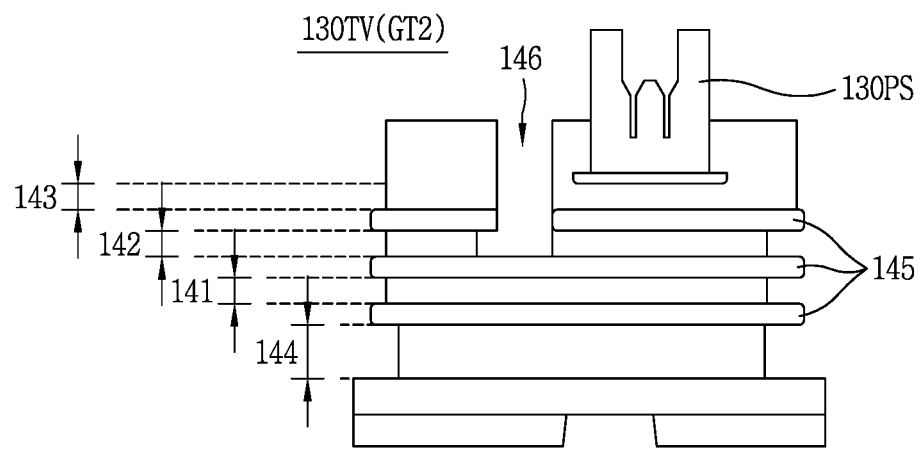
FIG. 13A is a front view of an example V-phase terminal tab of an example stator insulator.

The V-phase terminal tab 130TV may be formed as shown in FIG. 13A.

Figure 13B:
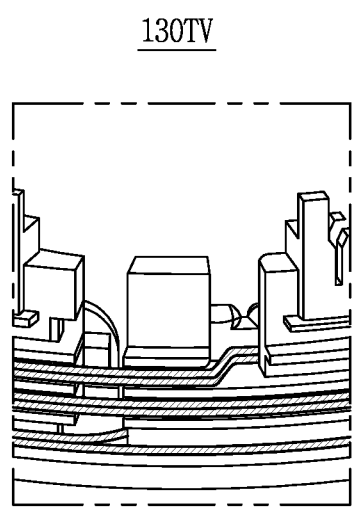
FIG. 13B is a perspective view of the V-phase terminal tab illustrated in FIG. 13A.

The V-phase terminal tab 130TV as shown in FIG. 13A may be formed in an arcuate shape along the outer circumferential surface as shown in FIG. 13B.

The guide groove 140 of the V-phase terminal tab 130TV may be formed as described above.

The V-phase terminal tab 130TV is a tab corresponding to the second guide tab 130TV (GT2). The V-phase power source of the three-phase power source may be connected to the V-phase terminal tab 130TV and three V-phase coils may be branched from the V-phase power source.

The V-phase power source and the three V-phase coils may be connected at the V-phase terminal tab 130TV.

In some implementations, at the V-phase terminal tab 130TV, the three V-phase coils may be branched to be wound around the three insulating teeth T2, T5 and T8.

The V-phase coil may be wound around the insulating tooth T2 corresponding to the V-phase terminal tab 130TV.

The V-phase terminal tab 130TV may be provided with the three-phase coil groove 146 formed on a left side surface thereof, and the power terminal coupling groove 130PS formed on an opposite surface of the three-phase coil groove 146.

The V-phase terminal tab 130TV may be formed such that the three-phase coil groove 146 may be formed at a height of the V-phase guide groove 142 and the power terminal PS connected to the V-phase power source may be connected to the power terminal coupling groove 130PS.

The V-phase power source may be connected to the V-phase terminal tab 130TV through the power terminal PS coupled to the power terminal coupling groove 130PS, and the three V-phase coils may be branched from the V-phase power source.

One of the V-phase coils may be wound on the insulating tooth T2 corresponding to the V-phase terminal tab 130TV and the other two may be placed on the V-phase guide groove 142 through the three-phase coil groove 146 so as to extend to the W-phase terminal tab 130TW.

In this instance, the coil wound on the insulating tooth T2 corresponding to the V-phase terminal tab 130TV may be a coil connected to the left slot of the power terminal PS when viewed from a rear surface of the V-phase terminal tab 130TV. The two coils placed on the V-phase guide groove 142 through the three-phase coil groove 146 may be coils connected to the right slot of the power terminal PS, namely, the slot adjacent to the three-phase coil groove 146 when viewed from the rear surface of the V-phase terminal tab 130TV.

As shown in FIG. 13B, at the V-phase terminal tab 130TV, two V-phase coils extending from the U-phase terminal tab 130TU may be mounted on the U-phase guide groove 141, two V-phase coils bent in the three-phase coil groove 146 may be mounted on the V-phase guide groove 142, and one neutral coil bent diagonally from the insulating tooth T1 corresponding to the U-phase terminal tab 130TU may be mounted on the neutral guide groove 144.

Figure 14A:
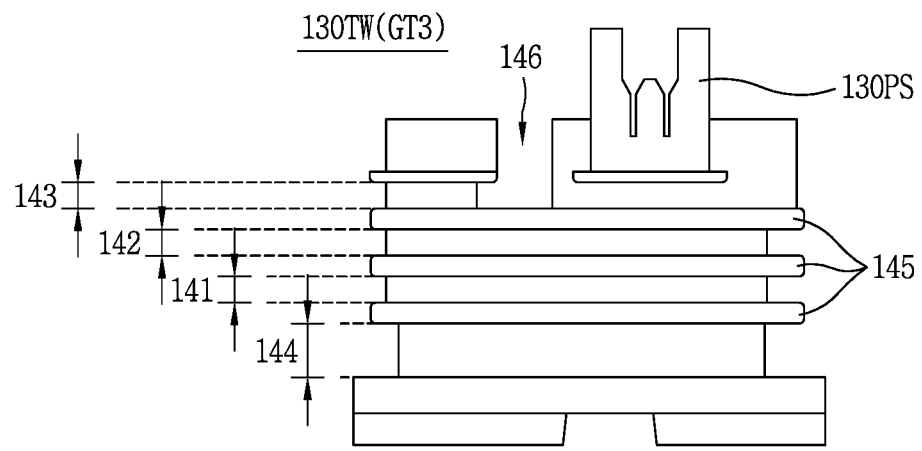
FIG. 14A is a front view of an example W-phase terminal tab of an example stator insulator.

The W-phase terminal tab 130TW may be formed as shown in FIG. 14A.

Figure 14B:
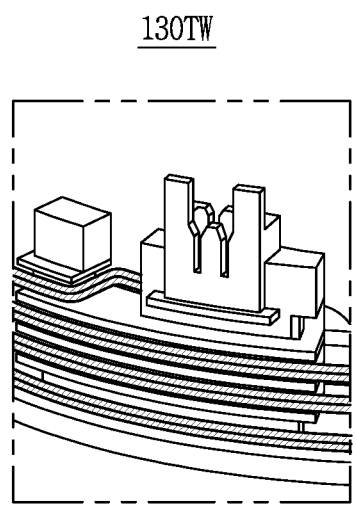
FIG. 14B is a perspective view of the W-phase terminal tab illustrated in FIG. 14A.

The W-phase terminal tab 130TW as shown in FIG. 14A may be formed in an arcuate shape along the outer circumferential surface as shown in FIG. 14B.

The guide groove 140 of the W-phase terminal tab 130TW may be formed as described above.

The V-phase terminal tab 130TW is a tab corresponding to the third guide tab 130TW (GT3). The W-phase power source of the three-phase power source may be connected to the W-phase terminal tab 130TW and three W-phase coils may be branched from the W-phase power source.

The W-phase power source and the three W-phase coils may be connected at the W-phase terminal tab 130TW.

In some implementations, at the W-phase terminal tab 130TW, the three W-phase coils may be branched to be wound around the three insulating teeth T3, T6 and T9.

The W-phase coil may be wound around the insulating tooth T3 corresponding to the W-phase terminal tab 130TW.

The W-phase terminal tab 130TW may be provided with the three-phase coil groove 146 formed on a left side surface thereof, and the power terminal coupling groove 130PS formed on an opposite side surface of the three-phase coil groove 146.

The W-phase terminal tab 130TW may be formed such that the three-phase coil groove 146 may be formed at a height of the W-phase guide groove 143 and the power terminal PS connected to the W-phase power source may be coupled to the power terminal coupling groove 130PS.

The W-phase power source may be connected to the W-phase terminal tab 130TW through the power terminal PS coupled to the power terminal coupling groove 130PS, and the three W-phase coils may be branched from the W-phase power source.

One of the W-phase coils may be wound on the insulating tooth T3 corresponding to the W-phase terminal tab 130TW and the other two may be placed on the W-phase guide groove 143 through the three-phase coil groove 146 to extend to the plurality of middle tabs 130M.

In this instance, the coil wound around the insulating tooth T3 corresponding to the W-phase terminal tab 130TW may be a coil connected to the left slot of the power terminal PS when viewed from the rear of the W phase terminal tab 130TW, and the two coils placed on the W-phase guide groove 143 through the three-phase coil groove 146 may be coils connected to the right slot of the power terminal PS, namely, the slot adjacent to the three-phase coil groove 146 when viewed from the rear of the W-phase terminal tab 130TW.

At such W-phase terminal tab 130TW, as illustrated in FIG. 14B, two U-phase coils extending form the V-phase terminal tab 130TV may be placed on the U-phase guide groove 141, two V-phase coils extending from the V-phase terminal tab 130TV may be placed on the V-phase guide groove 142, two W-phase coils bent in the three-phase coil groove 146 may be placed on the W-phase guide groove 143, and one neutral coil extending from the V-phase terminal tab 130TU and one neutral coil bent diagonally from the insulating tooth T2 corresponding to the V-phase terminal tab 130TV may be placed on the neutral guide groove 144.

As shown in FIGS. 7A and 7B, the plurality of middle tabs 130M may include a U-phase middle tab 130MU where a U-phase coil of the three-phase coils is wound around the corresponding insulating tooth T4, a V-phase middle tab 130TV where a V-phase coil of the three-phase coils is wound around the corresponding insulating tooth T5, and a W-phase middle tab 130TW where a W-phase coil of the three-phase coils is wound around the corresponding insulating tooth T6.

Figure 15A:
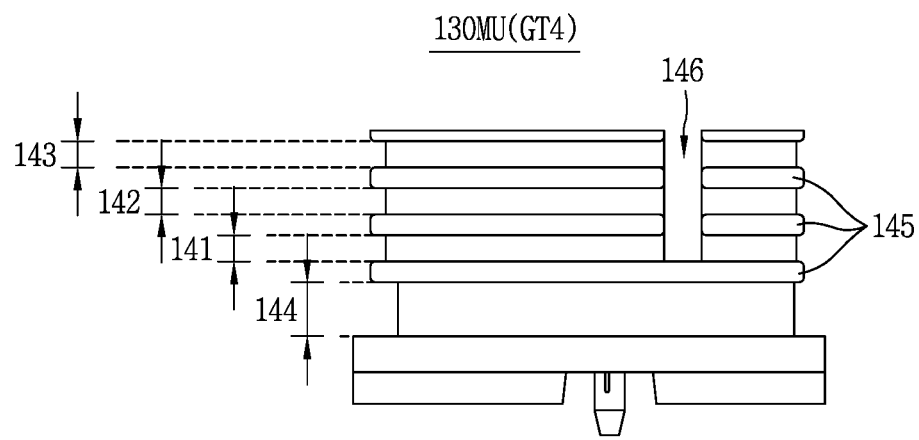
FIG. 15A is a front view of an example U-phase middle tab of an example stator insulator.

The U-phase middle tab 130MU may be formed as shown in FIG. 15A.

Figure 15B:
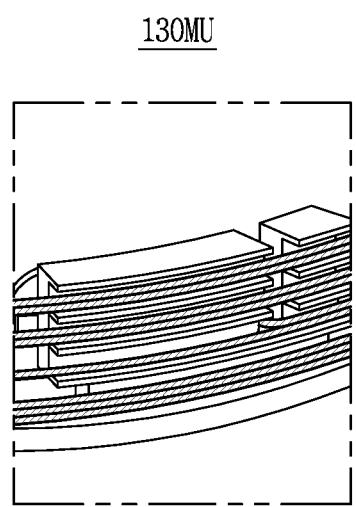
FIG. 15B is a perspective view of the U-phase middle tab illustrated in FIG. 15A.

The U-phase middle tab 130MU as shown in FIG. 15A may be formed in an arcuate shape along the outer circumferential surface as shown in FIG. 15B.

The guide groove 140 of the U-phase middle tab 130MU may be formed as described above.

The U-phase middle tab 130MU is a tab corresponding to the fourth guide tab 130MU (GT4), and the U-phase coil may be wound on the corresponding insulating tooth T4.

The U-phase middle tab 130MU may be provided with the three-phase coil groove 146 on a right side surface thereof.

The U-phase middle tab 130MU may be formed such that the three-phase coil groove 146 has a height of the U-phase guide groove 141.

At the U-phase middle tab 130MU, one of the two U-phase coils extending from the W-phase terminal tab 130TW may be wound around the corresponding insulating tooth T4 through the three-phase coil groove 146 and the other one may extend to the V-phase middle tab 130MV.

In this instance, the coil wound on the insulating tooth T4 corresponding to the U-phase middle tab 130MU may be linearly bent to the corresponding insulating tooth T4 from the U-phase guide groove 141 through the three-phase coil groove 146 and wound around the insulating tooth T4, when viewed from the rear of the U-phase middle tab 130MU.

At such U-phase middle tab 130MU, as illustrated in FIG. 15B, one of two U-phase coils extending from the W-phase terminal tab 130TW may be wound on the corresponding insulating tooth T4 such that the other one U-phase coil can be placed on the U-phase guide groove 141, two V-phase coils extending from the W-phase terminal tab 130TW may be placed on the V-phase guide groove 142, two W-phase coils extending from the W-phase terminal tab 130TW may be placed on the W-phase guide groove 143, and two neutral coils extending from the W-phase terminal tab 130TW and one neutral coil bent diagonally from the insulating tooth T3 corresponding to the W-phase terminal tab 130TW may be placed on the neutral guide groove 144.

Figure 16A:
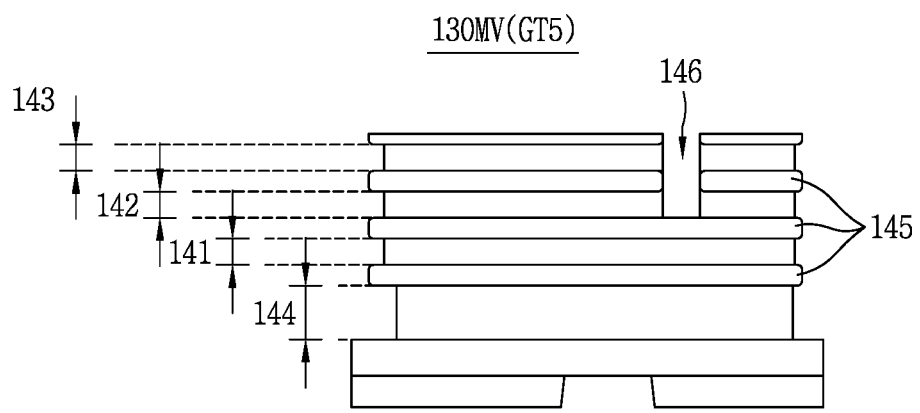
FIG. 16A is a front view of an example V-phase middle tab of an example stator insulator.

The V-phase middle tab 130MV may be formed as shown in FIG. 16A.

Figure 16B:
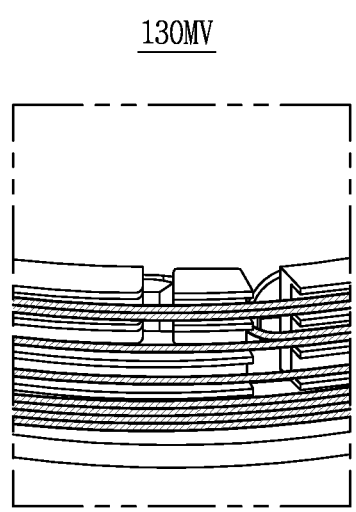
FIG. 16B is a perspective view of the V-phase middle tab illustrated in FIG. 16A.

The V-phase middle tab 130MV as shown in FIG. 16A may be formed in an arcuate shape along the outer circumferential surface as shown in FIG. 16B.

The guide groove 140 of the V-phase middle tab 130MV may be formed as described above.

The V-phase middle tab 130MV is a tab corresponding to the fifth guide tab 130MV (GT5), and the V-phase coil may be wound on the corresponding insulating tooth T5.

The V-phase middle tab 130MV may be provided with the three-phase coil groove 146 on a right side surface thereof.

The V-phase middle tab 130MV may be formed such that the three-phase coil groove 146 has a height of the V-phase guide groove 142.

At the V-phase middle tab 130MV, one of the two V-phase coils extending from the U-phase middle tab 130MU and placed on the V-phase guide groove 142 may be wound around the corresponding insulating tooth T5 through the three-phase coil groove 146 and the other one may extend to the W-phase middle tab 130MW.

In this instance, the coil wound on the insulating tooth T5 corresponding to the V-phase middle tab 130MV may be linearly bent to the corresponding insulating tooth T5 from the V-phase guide groove 142 through the three-phase coil groove 146 and wound around the insulating tooth T5, when viewed from the rear of the V-phase middle tab 130MV.

At the V-phase terminal tab 130MV, as illustrated in FIG. 16B, one U-phase coil extending from the U-phase middle tab 130MU may be placed on the U-phase guide groove 141. One of two V-phase coils extending from the U-phase middle tab 130MU may be wound around the corresponding insulating tooth such that the other one V-phase coil can be placed on the V-phase guide groove 142. Two W-phase coils extending from the U-phase middle tab 130MU may be placed on the W-phase guide groove 143. Three neutral coils extending from the U-phase middle tab 130MU and one neutral coil bent diagonally from the insulating tooth T4 corresponding to the U-phase middle tab 130MU may be placed on the neutral guide groove 144.

Figure 17A:
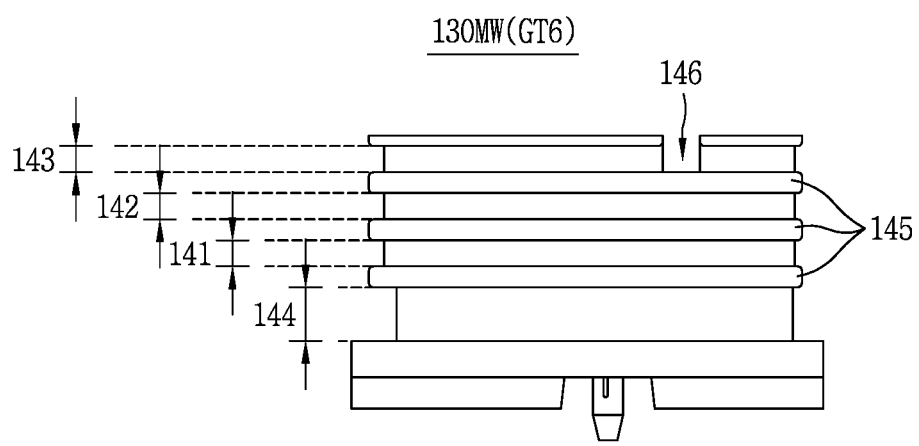
FIG. 17A is a front view of an example W-phase middle tab of an example stator insulator.

The W-phase middle tab 130MW may be formed as shown in FIG. 17A.

Figure 17B:
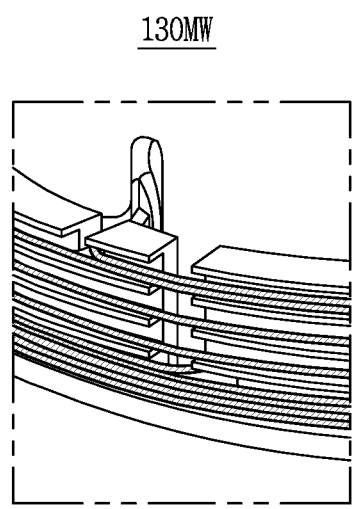
FIG. 17B is a perspective view of the W-phase middle tab illustrated in FIG. 17A.

The W-phase middle tab 130MW as shown in FIG. 17A may be formed in an arcuate shape along the outer circumferential surface as shown in FIG. 17B.

The guide groove 140 of the W-phase middle tab 130MW may be formed as described above.

The W-phase middle tab 130MV is a tab corresponding to the sixth guide tab 130MW (GT6), and the W-phase coil may be wound on the corresponding insulating tooth T6.

The W-phase middle tab 130MW may be provided with the three-phase coil groove 146 on a right side surface thereof.

The W-phase middle tab 130MW may be formed such that the three-phase coil groove 146 has a height of the W-phase guide groove 143.

At the W-phase middle tab 130MW, one of two W-phase coils extending from the V-phase middle tab 130MV and placed on the W-phase guide groove 143 may be wound around the corresponding insulating tooth T6 through the three-phase coil groove 146 and the other one may extend to the plurality of neutral tabs 130N.

In this instance, the coil wound on the insulating tooth T6 corresponding to the W-phase middle tab 130MW may be linearly bent to the corresponding insulating tooth T6 from the W-phase guide groove 143 through the three-phase coil groove 146 and wound around the insulating tooth T6, when viewed from the rear of the W-phase middle tab 130MW.

At such W-phase terminal tab 130MW, as illustrated in FIG. 14B, one U-phase coil extending from the V-phase middle tab 130MU may be placed on the U-phase guide groove 141, one V-phase coil extending from the V-phase middle tab 130MV may be placed on the V-phase guide groove 142, one of two W-phase coils extending from the V-phase middle tab 130MV may be wound on the corresponding insulating tooth T6 such that the other one W-phase coil may be placed on the W-phase guide groove 143, and four neutral coils extending from the V-phase middle tab 130MV and one neutral coil bent diagonally from the insulating tooth T5 corresponding to the V-phase middle tab 130MV may be placed on the neutral guide groove 144.

The plurality of neutral tabs 130N, as illustrated in FIG. 6C, may include a U-phase middle tab 130NU where neutral coils of the insulating teeth T1, T2 and T3 corresponding to the plurality of three-phase terminal tabs 130T are connected, a V-phase middle tab 130NV where neutral coils of the insulating teeth T4, T5 and T6 corresponding to the plurality of middle tabs 130M are connected, and a W-phase neutral tab 130NW where neutral coils of the insulating teeth 7, T8 and T9 corresponding to the plurality of neutral tabs 130N are connected.

Figure 18A:
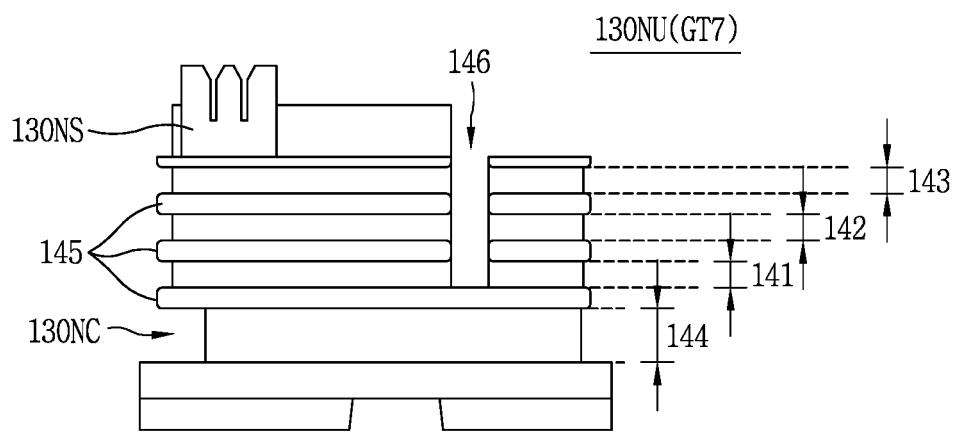
FIG. 18A is a front view of an example U-phase neutral tab of an example stator insulator.

The U-phase middle tab 130NU may be formed as shown in FIG. 18A.

Figure 18B:
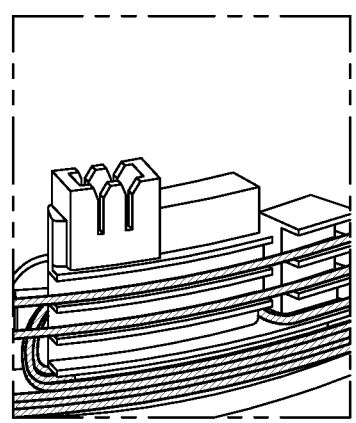
FIG. 18B is a perspective view of the U-phase neutral tab illustrated in FIG. 18A.

The U-phase neutral tab 130NU as shown in FIG. 18A may be formed in an arcuate shape along the outer circumferential surface as shown in FIG. 18B.

The guide groove 140 of the U-phase neutral tab 130NU may be formed as described above.

The U-phase neutral tab 130NU is a tab corresponding to the seventh guide tab 130NU (GT7), and three neutral coils of the insulating teeth T1, T2 and T3 corresponding to the plurality of three-phase terminal tabs 130T may be connected at the U-phase neutral tab 130NU.

In some implementations, at the U-phase neutral tab 130NU, three neutral coils wound on the insulating teeth T1, T2 and T3 corresponding to the plurality of three-phase terminal tabs 130T may be connected to one neutral point.

The U-phase coil may be wound around the insulating tooth T7 corresponding to the U-phase neutral tab 130NU.

The U-phase neutral tab 130NU may be provided with the three-phase coil groove 146 formed on a right side thereof, and a neutral terminal coupling groove 130NS and a neutral coil groove 130NC formed on a side surface opposite to the three-phase coil groove 146.

The three-phase coil groove 146 of the U-phase neutral tab 130NU may be formed at a height of a U-phase guide groove 141, the neutral terminal NS, to which three neutral coils of the insulating teeth T1, T2, and T3 corresponding to the plurality of three-phase terminal tabs 130T are connected, may be coupled to the neutral terminal coupling groove 130NS, and the three neutral coils of the insulating teeth T1, T2, and T3 corresponding to the three-phase terminal tabs 130T may be connected to the neutral terminal NS through the neutral coil groove 130NC.

One U-phase coil extending from the W-phase middle tab 130MW and placed on the U-phase guide groove 141 may be wound around the insulating tooth corresponding to the U-phase neutral tab 130NU through the three-phase coil groove 146.

In this instance, the coil wound on the insulating tooth T7 corresponding to the U-phase neutral tab 130NU may be linearly bent to the corresponding insulating tooth T7 from the U-phase guide groove 141 through the three-phase coil groove 146 and wound around the insulating tooth T7, when viewed from the rear of the U-phase neutral tab 130NU.

At the U-phase neutral tab 130NU, three neutral coils of the insulating teeth T1, T2 and T3 corresponding to the plurality of three-phase terminal tabs 130T may be connected to a neutral point through the neutral terminal NS coupled to the neutral terminal coupling groove 130NS.

At the U-phase neutral tab 130NU, three neutral coils of the insulating teeth T1, T2 and T3 corresponding to the plurality of three-phase terminal tabs 130T among six neutral coils, which extend from the W-phase neutral tab 130MW and are bent diagonally from the insulating tooth T6 corresponding to the W-phase neutral tab 130MW to be placed on the neutral guide groove 144, may be connected to the neutral terminal NS through the neutral coil groove 130NC, and the remaining three neutral coils of the insulating teeth T4, T5, and T6 corresponding to the plurality of middle tabs 130M may extend to the V-phase neutral tab 130NV.

In this instance, when viewed from the rear of the U-phase neutral tab 130NU, the coils connected to the neutral terminal NS may be linearly bent to the neutral terminal from the neutral guide groove 144 through the neutral coil groove 130NC and wound.

At such U-phase neutral tab 130NU, as illustrated in FIG. 18B, one V-phase coil extending from the W-phase middle tab 130MW may be placed on the V-phase guide groove 142, one W-phase coil extending from the W-phase middle tab 130MW may be placed on the W-phase guide groove 143, three neutral coils of the teeth T1, T2 and T3 corresponding to the plurality of three-phase terminal tabs 130T among five neutral coils extending from the W-phase middle tab 130MW are connected to the neutral terminal NS such that two neutral coils of the insulating teeth T4 and T5 corresponding to the plurality of middle tabs 130M and one neutral coil bent diagonally from the insulating tooth T6 corresponding to the W-phase middle tab 130MW can be placed on the neutral guide groove 144.

Figure 19A:
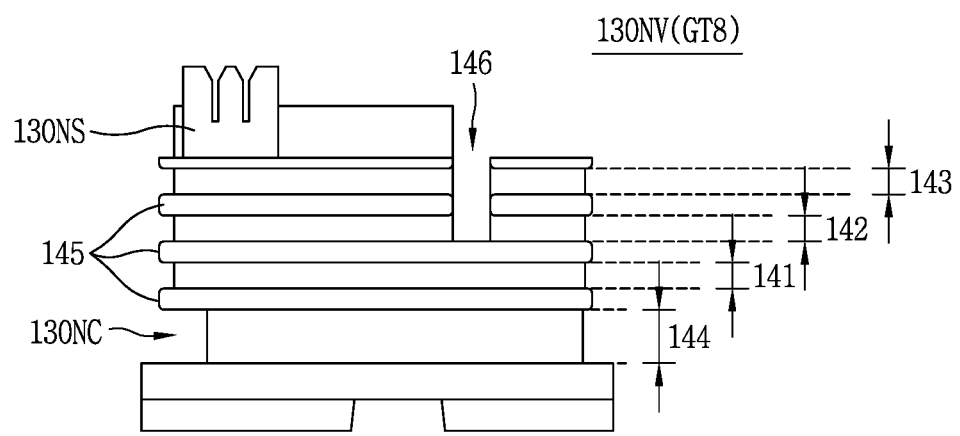
FIG. 19A is a front view of an example V-phase neutral tab of an example stator insulator.

The V-phase neutral tab 130NV may be formed as shown in FIG. 19A.

Figure 19B:
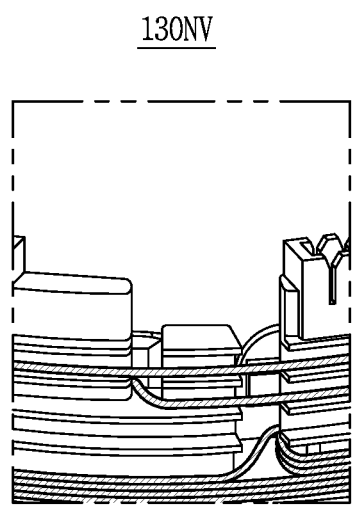
FIG. 19B is a perspective view of the V-phase neutral tab illustrated in FIG. 19A.

The V-phase neutral tab 130NV as shown in FIG. 19A may be formed in an arcuate shape along the outer circumferential surface as shown in FIG. 19B.

The guide groove 140 of the V-phase neutral tab 130NV may be formed as described above.

The V-phase neutral tab 130NV is a tab corresponding to the eighth guide tab 130NV (GT8), and three neutral coils of the insulating teeth T4, T5 and T6 corresponding to the plurality of three-phase terminal tabs 130M may be connected at the V-phase neutral tab 130NV.

In some implementations, at the V-phase neutral tab 130NV, three neutral coils wound on the insulating teeth T4, T5 and T6 corresponding to the plurality of three-phase terminal tabs 130M may be connected to one neutral point.

The V-phase coil may be wound around the insulating tooth T8 corresponding to the V-phase neutral tab 130NV.

The V-phase neutral tab 130NV may be provided with the three-phase coil groove 146 formed on a right side thereof, and the neutral terminal coupling groove 130NS and the neutral coil groove 130NC formed on a side surface opposite to the three-phase coil groove 146.

The three-phase coil groove 146 of the V-phase neutral tab 130NV may be formed at a height of a V-phase guide groove 142, the neutral terminal NS, to which three neutral coils of the insulating teeth T4, T5, and T6 corresponding to the plurality of three-phase terminal tabs 130M are connected, may be coupled to the neutral terminal coupling groove 130NS, and the three neutral coils of the insulating teeth T4, T5, and T6 corresponding to the three-phase terminal tabs 130M may be connected to the neutral terminal NS through the neutral coil groove 130NC.

One V-phase coil extending from the U-phase neutral tab 130NU and placed on the V-phase guide groove 142 may be wound around the insulating tooth corresponding to the V-phase neutral tab 130NV through the three-phase coil groove 146.

In this instance, the coil wound on the insulating tooth T8 corresponding to the V-phase neutral tab 130NV may be linearly bent to the corresponding insulating tooth T8 from the V-phase guide groove 142 through the three-phase coil groove 146 and wound around the insulating tooth T8, when viewed from the rear of the V-phase neutral tab 130NV.

At the V-phase neutral tab 130NV, three neutral coils of the insulating teeth T4, T5 and T6 corresponding to the plurality of three-phase terminal tabs 130M may be connected to one neutral point through the neutral terminal NS coupled to the neutral terminal coupling groove 130NS.

At the V-phase neutral tab 130NV, three neutral coils of the insulating teeth T4, T5 and T6 corresponding to the plurality of three-phase middle tabs 130M among four neutral coils, which extend from the U-phase neutral tab 130NU and are bent diagonally from the insulating tooth T7 corresponding to the U-phase neutral tab 130NU to be placed on the neutral guide groove 144, may be connected to the neutral terminal NS through the neutral coil groove 130NC, and the remaining one neutral coil of the insulating tooth T7 corresponding to the U-phase neutral tab 130NU may extend to the W-phase neutral tab 130NW.

In this instance, when viewed from the rear of the V-phase neutral tab 130NV, the coils connected to the neutral terminal NS may be linearly bent to the neutral terminal NS from the neutral guide groove 144 through the neutral coil groove 130NC and wound.

At such V-phase neutral tab 130NV, as illustrated in FIG. 19B, one W-phase coil extending from the U-phase neutral tab 130NU may be placed on the W-phase guide groove 143, three neutral coils of the insulating teeth corresponding to the plurality of middle tabs 130M among three neutral coils extending from the U-phase neutral tab 130NU may be connected to the neutral terminal NS such that the remaining one neutral coil bent diagonally from the insulating teeth T7 corresponding to the U-phase neutral tab 130NU may be placed on the neutral guide groove 144.

Figure 20A:
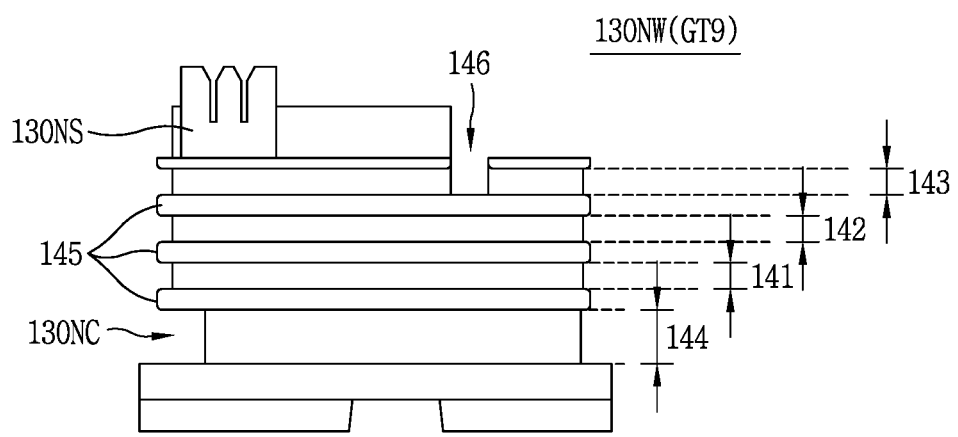
FIG. 20A is a front view of an example W-phase neutral tab of an example stator insulator.

The W-phase neutral tab 130NW may be formed as shown in FIG. 20A.

Figure 20B:
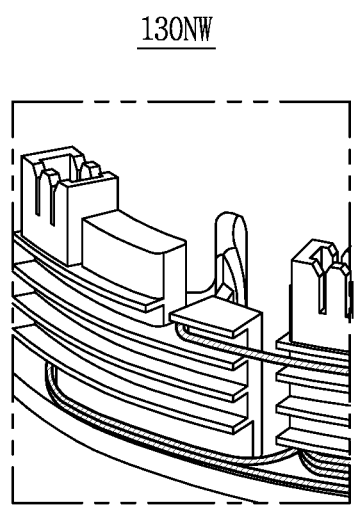
FIG. 20B is a perspective view of the W-phase neutral tab illustrated in FIG. 20A.

The W-phase neutral tab 130NW as shown in FIG. 20A may be formed in an arcuate shape along the outer circumferential surface as shown in FIG. 20B.

The guide groove 140 of the W-phase neutral tab 130NW may be formed as described above.

The W-phase neutral tab 130NW is a tab corresponding to the ninth guide tab 130NW (GT9), and three neutral coils of the insulating teeth T7, T8 and T9 corresponding to the plurality of neutral tabs 130N may be connected at the W-phase neutral tab 130NW.

In some implementations, at the W-phase neutral tab 130NW, three neutral coils wound on the insulating teeth T7, T8 and T9 corresponding to the plurality of neutral tabs 130N may be connected to one neutral point.

The W-phase coil may be wound around the insulating tooth T9 corresponding to the W-phase neutral tab 130NW.

The W-phase neutral tab 130NW may be provided with the three-phase coil groove 146 formed on a right side thereof, and the neutral terminal coupling groove 130NS and the neutral coil groove 130NC formed on a side surface opposite to the three-phase coil groove 146.

The three-phase coil groove 146 of the W-phase neutral tab 130NW may be formed at a height of a W-phase guide groove 143, the neutral terminal NS, to which three neutral coils of the insulating teeth T7, T8, and T9 corresponding to the plurality of middle tabs 130M are connected, may be coupled to the neutral terminal coupling groove 130NS, and the three neutral coils of the insulating teeth T7, T8, and T9 corresponding to the plurality of middle tabs 130M may be connected to the neutral terminal NS through the neutral coil groove 130NC.

One W-phase coil extending from the V-phase neutral tab 130NV and placed on the W-phase guide groove 143 may be wound around the insulating tooth T9 corresponding to the W-phase neutral tab 130NW through the three-phase coil groove 146.

In this instance, the coil wound on the insulating tooth T9 corresponding to the W-phase neutral tab 130NW may be linearly bent to the corresponding insulating tooth T9 from the W-phase guide groove 143 through the three-phase coil groove 146 and wound around the insulating tooth T8, when viewed from the rear of the W-phase neutral tab 130NW.

At the W-phase neutral tab 130NW, three neutral coils of the insulating teeth T7, T8 and T9 corresponding to the plurality of neutral tabs 130N may be connected to one neutral point through the neutral terminal NS coupled to the neutral terminal coupling groove 130NS.

At the W-phase neutral tab 130NW, two neutral coils extending from the V-phase neutral tab 130NV and bent diagonally from the insulating teeth T8 corresponding to the V-phase neutral tab 130NV to be placed on the neutral guide groove 144 may be connected to the neutral terminal NS through the neutral coil groove 130NC, and the other one neutral coil of the insulating tooth T9 corresponding to the W-phase neutral tab 130NW may be connected directly to the neutral terminal NS.

In this instance, when viewed from the rear of the W-phase neutral tab 130NW, the coil connected to the neutral terminal NS may be linearly bent to the neutral terminal NS from the neutral guide groove 144 through the neutral coil groove 130NC and wound.

At such W-phase neutral tab 130NW, as illustrated in FIG. 20B, the three-phase coils and the neutral coils which extend from the V-phase neutral tab 130NV and are placed on the plurality of guide grooves 140 may be completely connected.

Figure 21:
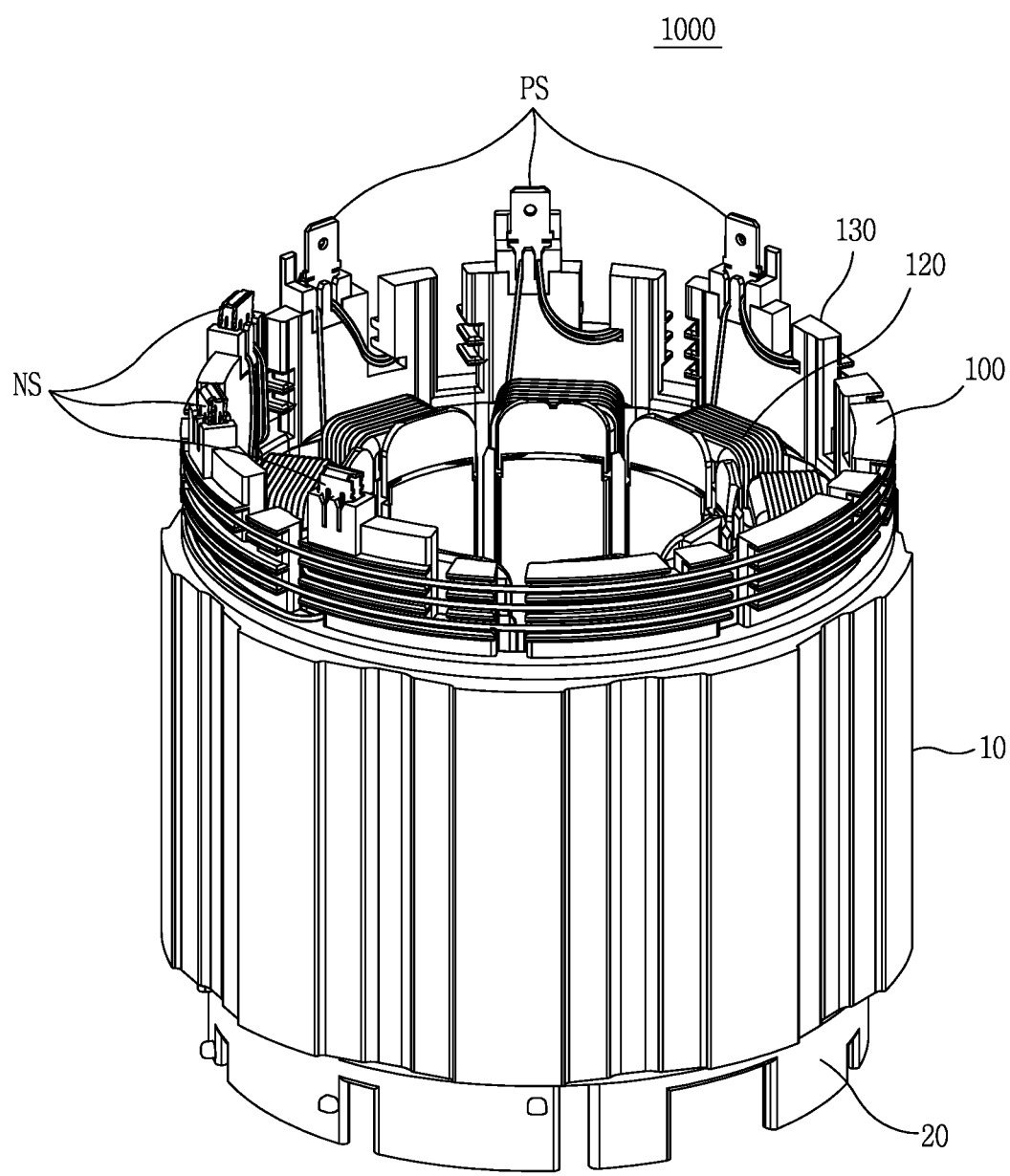
FIG. 21 is a perspective view illustrating an example stator and an example stator insulator coupled to the stator.

A stator 1000 to which the insulator 100 having the above-described structure is coupled may be configured as shown in FIG. 21.

FIG. 21 is a completely-coupled view of the insulator 100 to the stator core 10 according to the configuration and connection structure of the insulator 100 described above, namely, illustrating a connection structure of FIG. 1. Also, FIG. 21 illustrates an implementation of a stator 1000 which is different from the insulator 100 described above.

The stator 1000 illustrated in FIG. 21, which illustrates the completely-coupled state of the insulator 100 to the stator core 10, includes the stator core 10 and the insulator 100 coupled to the top of the stator core 10. The insulator 100 is the aforementioned insulator 100.

In some implementations, the insulator 100 in the stator 1000 according to the implementation illustrated in FIG. 21 may correspond to an insulator configured as illustrated in FIGS. 2 and 3. The insulator 100 includes the plurality of insulating teeth 120 protruding toward the center portion of the main body 110 formed in the ring shape and coupled to the plurality of teeth of the stator core 10, respectively, and the plurality of guide tabs 130 protruding from the outer circumferential surface of the main body 110 to correspond to the plurality of insulating teeth 120 such that three-phase coils wound on the plurality of insulating teeth 120 and neutral coils of the respective three-phase coils are placed along the outer circumferential surface in the circumferential direction.

The stator 1000 may further include the lower insulator 20 as described above.

A detailed implementation of the insulator 100 included in the stator 1000 may be as described above, and thus a redundant description will be omitted.

In the stator 1000, the plurality of guide tabs 130, as aforementioned, may include a plurality of three-phase terminal tabs 130T (130TU, 130TV, and 130TW) where a three-phase power source and the three-phase coils branched from the three-phase power source are connected, the plurality of middle tabs 130M (130MU, 130MV, and 130MW) through which the three-phase coils and the neutral coils pass, and the plurality of neutral tabs 130N (130NU, 130NV And 130NW) where the neutral coils are connected.

Each of the plurality of guide tabs 130 in the stator 1000 may be provided with the three-phase coil groove 146 formed on one side thereof such that the three-phase coils are drawn out in the outer diameter direction of the main body 110 or inserted in the inner diameter direction of the main body 110.

In the stator 1000, each of the plurality of three-phase terminal tabs 130T may include the power terminal PS to which the three-phase power source and the three-phase coils are connected.

Each of the plurality of neutral tabs 130N in the stator 1000 may be provided at its top with the neutral terminal NS to which the neutral coil is connected.

Each of the plurality of neutral tabs 130N in the stator 1000 may be provided with the three-phase coil groove 130NS formed at one side of the lowermost guide groove such that the neutral coils are drawn out in the outer diameter direction of the main body 110 or inserted in the inner diameter direction of the main body 110.

The stator 1000 includes the insulator 100, and accordingly the three-phase parallel connection is performed through the insulator 100.

Figure 22:
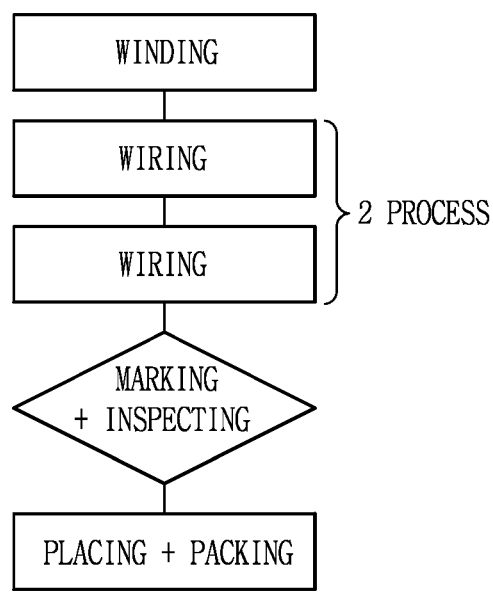
FIG. 22 is a flowchart illustrating an example assembly process of a stator and a stator insulator.

In the insulator 100 and the stator 1000 as described above, an assembly process of the stator may be performed, as illustrated in FIG. 22, in the order of winding, connection (two steps), marking/inspection, and stacking/packaging, by virtue of the structure of the insulator facilitating the three-phase parallel connection.

This shows an improved process from an assembly process in related art requiring nine connection processes. The number of processes which include totally 13 steps in the related art can be reduced to four processes.

Figure 23:
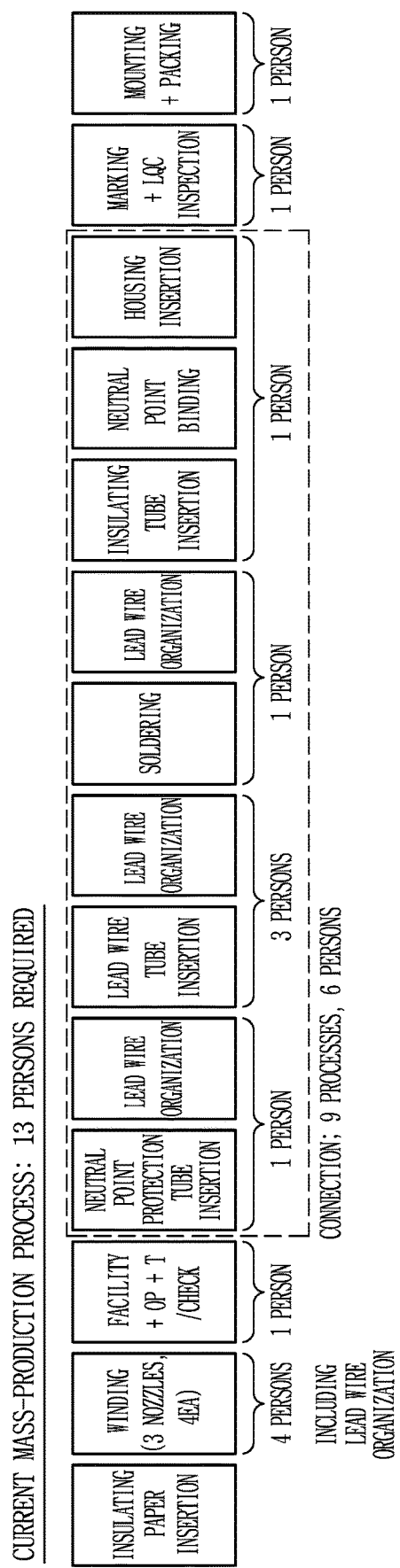
FIG. 23 is a block diagram illustrating a parallel connection process in related art.

More specifically, as illustrated in FIG. 23, the related art connection process has been performed in the order of i) inserting a neutral point protection tube, ii) a lead wire organization, iii) inserting a lead wire tube, iv) soldering, vi) organizing the lead wire, vii) inserting an insulating tube, viii) neutral point packing, and ix) housing insertion, and these totally 9 steps have been performed by 6 people or operators.

Figure 24:
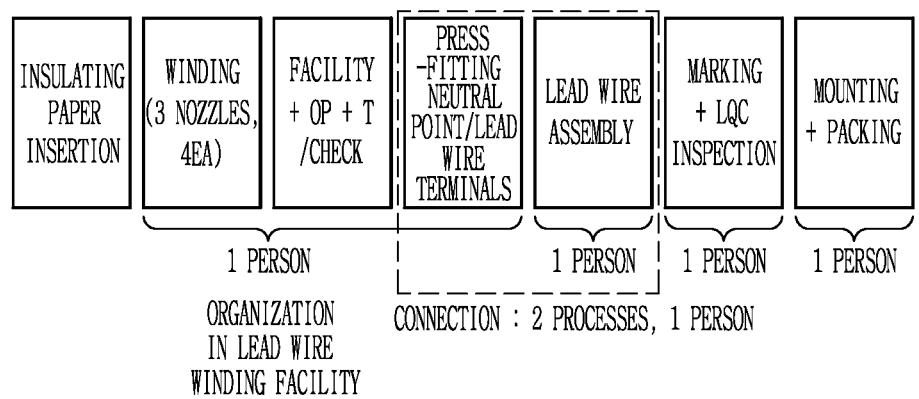
FIG. 24 is a block diagram illustrating an example of a three-phase connection process according to coupling of an example stator insulator disclosed herein.

However, according to the insulator disclosed in this specification, as illustrated in FIG. 24, the connection process is performed in the order of press-fitting neutral point/lead wire terminals, and lead wire assembly, and these two steps can be performed by one person.

As described above, according to a stator insulator and a stator described in this specification, an insulator with a structure capable of facilitating a connection of three-phase coils and neutral coils can be provided, thereby reducing time and cost required during a process for a three-phase parallel connection.

In addition, an insulator having a structure in which three-phase coils and neutral wire coils can be securely mounted and connected can be provided, which may result in enhancing stability and reliability of a three-phase parallel connection and increasing lifespan and efficiency of a product.

So far, the detailed implementations according to the present disclosure have been described, but it will be understood by those skilled in the art that various changes and modifications may be made therein without departing from the spirit and scope of the disclosure. Therefore, the scope of the present disclosure should not be limited by the described implementations, but should be determined by the scope of the appended claims and equivalents thereof.

The present disclosure has been particularly shown and described with reference to those exemplary implementations, it is to be understood that various changes and modification can be made from this disclosure by those skilled in the art to which the present disclosure belongs. It is therefore intended that all of the equivalent or equivalent variations thereof fall within the scope of the present disclosure.

What is claimed is:

1. An insulator of a stator that includes a stator core, the insulator being configured to couple to a top portion of the stator core, the insulator comprising:
    a main body that has a ring shape;
    a plurality of insulating teeth that protrude toward a center portion of the main body and that are configured to couple to a plurality of teeth of the stator core, respectively; and
    a plurality of guide tabs that protrude from an outer circumferential surface of the main body at positions corresponding to the plurality of insulating teeth, the plurality of guide tabs being configured to guide (i) phase coils that are wound around the plurality of insulating teeth and (ii) neutral coils along the outer circumferential surface in a circumferential direction,
    wherein each of the plurality of guide tabs defines a plurality of guide grooves, each of the plurality of guide grooves being configured to seat at least one of the phase coils or the neutral coils, and
    wherein the plurality of guide tabs comprise:
        a plurality of terminal tabs configured to connect to a three-phase power source and to the phase coils that extend from the three-phase power source,
        a plurality of middle tabs through which the phase coils and the neutral coils pass, and
        a plurality of neutral tabs configured to connect to the neutral coils.

2. The insulator of claim 1, wherein the plurality of guide grooves are arranged along a height direction of each of the plurality of guide tabs and extend in a radial direction of the main body.

3. The insulator of claim 2, wherein each of the plurality of guide tabs comprises a plurality of insulating layers that define the plurality of guide grooves and that are arranged along the height direction to seat the phase coils and the neutral coils at different heights from one another.

4. The insulator of claim 3, wherein a lowermost groove among the plurality of guide grooves is configured to seat the neutral coils.

5. The insulator of claim 3, wherein the phase coils comprise a U-phase coil, a V-phase coil, and a W-phase coil,
    wherein the plurality of guide grooves comprise a U-phase guide groove configured to seat the U-phase coil, a V-phase guide groove configured to seat the V-phase coil, a W-phase guide groove configured to seat the W-phase coil, and a neutral guide groove configured to seat the neutral coils, and wherein the U-phase guide groove, the V-phase guide groove, the W-phase guide groove, and the neutral guide groove are arranged along the height direction.

6. The insulator of claim 5, wherein each of the U-phase guide groove, the V-phase guide groove, and the W-phase guide groove is configured to seat at least two coils and has a first height that is greater than or equal to a thickness of the two coils, and
wherein the neutral guide groove is configured to seat at least three coils and has a second height that is greater than or equal to a thickness of the three coils.

7. The insulator of claim 3, wherein the plurality of guide grooves are spaced apart from one another by a distance that is greater than or equal to a predetermined interval.

8. The insulator of claim 3, wherein each of the plurality of insulating layers has a predetermined height between adjacent guide grooves among the plurality of guide grooves.

9. The insulator of claim 1, wherein each of the plurality of guide tabs defines a phase coil groove that is disposed at a side of each of the plurality of guide tabs, that extends in a vertical direction, and that allows the phase coils to be drawn out in an outer diameter direction of the main body or to be inserted in an inner diameter direction of the main body therethrough.

10. The insulator of claim 9, wherein the plurality of guide grooves are arranged at different heights, each height corresponding to a phase of an insulating tooth among the plurality of insulating teeth, and
wherein the phase coil groove extends in the vertical direction to a guide groove among the plurality of guide grooves corresponding to the phase of the insulating tooth.

11. The insulator of claim 9, wherein the phase coil groove is defined at a side of each of the plurality of terminal tabs, and allows the phase coils to extend to a neighboring guide tab among the plurality of terminal tabs and to be seated at the neighboring guide tab, and
wherein the phase coil groove is further defined at a side of each of the plurality of middle tabs and the plurality of neutral tabs, and is configured to receive the phase coils that extend from a neighboring guide tab among the plurality of middle tabs and the plurality of neutral tabs.

12. The insulator of claim 9, wherein each of the plurality of terminal tabs defines a power terminal coupling groove that is disposed at an upper portion of each of the plurality of terminal tabs and that is configured to couple to a power terminal connected to the three-phase power source or at least one of the phase coils, and
wherein each of the plurality of neutral tabs defines a neutral terminal coupling groove that is disposed at an upper portion of each of the plurality of neutral tabs and that is configured to couple to a neutral terminal connected to the neutral coils.

13. The insulator of claim 12, wherein each of the power terminal and the neutral terminal comprises a plurality of slots, and
wherein one of the plurality of slots is configured to connect to one coil, and another of the plurality of slots is configured to connect to two or more coils.

14. The insulator of claim 9, wherein each of the plurality of neutral tabs defines a neutral coil groove that is disposed at a side of a lowermost guide groove among the plurality of guide grooves and that allows the neutral coils to be drawn out in an outer diameter direction of the main body or to be inserted in an inner diameter direction of the main body therethrough.

15. A stator comprising:
a stator core; and
an insulator coupled to a top portion of the stator core, wherein the insulator comprises:
a main body that has a ring shape,
a plurality of insulating teeth that protrude toward a center portion of the main body and that are coupled to a plurality of teeth of the stator core, respectively, and
a plurality of guide tabs that protrude from an outer circumferential surface of the main body at positions corresponding to the plurality of insulating teeth, the plurality of guide tabs being configured to guide (i) phase coils that are wound around the plurality of insulating teeth and (ii) neutral coils along the outer circumferential surface in a circumferential direction,
wherein the plurality of guide tabs comprise:
a plurality of terminal tabs configured to connect to a three-phase power source and to the phase coils that extend from the three-phase power source,
a plurality of middle tabs through which the phase coils and the neutral coils pass, and
a plurality of neutral tabs configured to connect to the neutral coils, and
wherein each of the plurality of guide tabs defines a plurality of guide grooves that are separated from one another and that are configured to seat at least one of the phase coils or the neutral coils.

16. The stator of claim 15, wherein each of the plurality of guide tabs defines a phase coil groove that is disposed at a side of each of the plurality of guide tabs and that allows the phase coils to be drawn out in an outer diameter direction of the main body or to be inserted in an inner diameter direction of the main body therethrough.

17. The stator of claim 15, wherein each of the plurality of terminal tabs comprises a power terminal that is disposed at an upper portion of each of the plurality of terminal tabs and that is configured to connect to the three-phase power source or at least one of the phase coils.

18. The stator of claim 15, wherein each of the plurality of neutral tabs comprises a neutral terminal that is disposed at an upper portion of each of the plurality of terminal tabs and that is configured to connect to the neutral coils.

19. The stator of claim 15, wherein each of the plurality of neutral tabs defines a neutral coil groove that is disposed at a side of a lowermost guide groove among the plurality of guide grooves and that allows the neutral coils to be drawn out in an outer diameter direction of the main body or to be inserted in an inner diameter direction of the main body therethrough.

* * * * *